(12) United States Patent  
Yokoya et al.

(10) Patent No.: US 10,086,890 B2
(45) Date of Patent: Oct. 2, 2018

(54) ROBOT AND METHOD FOR USE OF ROBOT

(71) Applicant: Panasonic Intellectual Property Management Co., Ltd., Osaka (JP)

(72) Inventors: Mayu Yokoya, Tokyo (JP); Kazunori Yamada, Aichi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/619,569

(22) Filed: Jun. 12, 2017

(65) Prior Publication Data

US 2018/0001946 A1   Jan. 4, 2018

(30) Foreign Application Priority Data

Jun. 29, 2016   (JP) .................................. 2016-129237

(51) Int. Cl.
*B62D 57/032*   (2006.01)
*B62D 57/02*   (2006.01)
(Continued)

(52) U.S. Cl.
CPC ............. *B62D 57/032* (2013.01); *A61H 3/04* (2013.01); *B62D 57/022* (2013.01);
(Continued)

(58) Field of Classification Search
CPC .. B60L 15/30; B60L 15/2009; B60L 15/2036; B60L 3/0015; A61H 3/04;
(Continued)

(56) References Cited

U.S. PATENT DOCUMENTS

| | | | | |
|---|---|---|---|---|
| 7,544,172 | B2 * | 6/2009 | Santos-Munne | ....... A61H 3/008 601/5 |
| 8,695,736 | B1 * | 4/2014 | Samaroo | ............... B65F 1/1452 180/11 |

(Continued)

FOREIGN PATENT DOCUMENTS

| | | |
|---|---|---|
| DE | 102012202614 A1 | 8/2013 |
| JP | 2010-271911 | 12/2010 |

OTHER PUBLICATIONS

The Extended European Search Report dated Jan. 18, 2018 for the related European Patent Application No. 17176583.7.

(Continued)

*Primary Examiner* — Muhammad S Islam
(74) *Attorney, Agent, or Firm* — Greenblum & Bernstein, P.L.C.

(57) ABSTRACT

A robot includes a main body, a handlebar disposed on the main body and grippable by a user, a detection unit that detects a load applied to the handlebar, a moving device including a rotating body and moving the robot by controlling the rotation of the rotating body, and a switching unit that switches a support mode for supporting the user with walking. The support mode includes a first mode in which the robot autonomously moves to guide the user who is walking and a second mode in which the robot moves in accordance with a first load detected by the detection unit. When the robot moves in the first mode, the switching unit switches the support mode from the first mode to the second mode on the basis of the second load detected by the detection unit.

16 Claims, 26 Drawing Sheets

(51) Int. Cl.
  *B62D 57/028* (2006.01)
  *G05D 1/02* (2006.01)
  *A61H 3/04* (2006.01)
  *G05D 1/08* (2006.01)

(52) U.S. Cl.
  CPC ......... *B62D 57/028* (2013.01); *G05D 1/0238* (2013.01); *A61H 2003/043* (2013.01); *A61H 2201/1215* (2013.01); *A61H 2201/1635* (2013.01); *A61H 2201/503* (2013.01); *A61H 2201/5061* (2013.01); *A61H 2201/5064* (2013.01); *G05D 1/0229* (2013.01); *G05D 1/0891* (2013.01)

(58) Field of Classification Search
  CPC ......... B62B 5/0083; B62B 3/001; B62B 5/06; B62B 5/0073; B62D 57/032; B62D 57/024; B62D 57/028; G05D 1/0238; G05D 1/0229; G05D 1/0891
  USPC .......................... 318/568.12; 700/245; 901/1
  See application file for complete search history.

(56) References Cited

U.S. PATENT DOCUMENTS

| | | | | |
|---|---|---|---|---|
| 8,752,658 | B2 * | 6/2014 | Kurek | A61H 3/04 180/19.1 |
| 9,020,639 | B2 * | 4/2015 | Bewley | B25J 5/005 700/250 |
| 9,207,674 | B2 * | 12/2015 | Takaoka | G05D 1/0088 |
| 9,211,894 | B2 * | 12/2015 | Gibson | B62B 1/002 |
| 9,315,115 | B2 * | 4/2016 | Katayama | B60L 15/10 |
| 9,365,226 | B1 * | 6/2016 | Chheda | B62B 3/04 |
| 9,474,678 | B2 * | 10/2016 | Hane | A61H 3/04 |
| 9,603,761 | B2 * | 3/2017 | Fukunaga | A61H 3/04 |
| 9,637,150 | B1 * | 5/2017 | Macfarlane | B62B 3/02 |
| 9,770,377 | B2 * | 9/2017 | Isozumi | A61G 5/14 |
| 2004/0097330 | A1 * | 5/2004 | Edgerton | A61H 1/0237 482/1 |
| 2006/0048980 | A1 * | 3/2006 | Kataoka | B62B 3/001 180/19.2 |
| 2008/0047375 | A1 * | 2/2008 | Sonoura | G05D 1/0891 74/5.22 |
| 2012/0018233 | A1 * | 1/2012 | Chang | A61H 3/04 180/19.2 |
| 2015/0005938 | A1 * | 1/2015 | Suzuki | A61G 7/1017 700/253 |
| 2015/0019013 | A1 * | 1/2015 | Rose | G01L 1/16 700/258 |
| 2016/0287465 | A1 * | 10/2016 | Rabin | A61H 3/04 |
| 2017/0326019 | A1 * | 11/2017 | Bramsiepe | A61H 3/04 |

OTHER PUBLICATIONS

Haoyong Yu et al: "An Adaptive Shared Control System for an Intelligent Mobility Aid for the Elderly", Autonomous Robots, Kluwer Academic Publishers, BO, vol. 15, No. 1, Jul. 1, 2003 (Jul. 1, 2003), pp. 53-66, XP019204874.

* cited by examiner

FIG. 6

| MOVEMENT DIRECTION/ GUIDANCE DIRECTION | SUPPORT MODE | LOAD TENDENCY OF USER ||
|---|---|---|---|
| | | FLUCTUATION FREQUENCY IN MOVEMENT DIRECTION/ GUIDANCE DIRECTION DURING WALKING | FLUCTUATION FREQUENCY IN DEVIATION DIRECTION OF CENTER OF GRAVITY DURING WALKING |
| FORWARD IN STRAIGHT LINE | GUIDANCE | Fz: 2 Hz | My: 2 Hz |
| FORWARD IN STRAIGHT LINE | MANUAL | Fz: 3 Hz | My: 2 Hz |
| BACKWARD IN STRAIGHT LINE | GUIDANCE | Fz: 2 Hz | My: 2 Hz |
| RIGHT TURN | MANUAL | Fz: 6 Hz | My: 4 Hz |
| ... | ... | ... | ... |

FIG. 8

| INPUT WAVEFORM | HANDLEBAR LOAD | | | | | | |
|---|---|---|---|---|---|---|---|
| | DATE AND TIME | Fx | Fy | Fz | Mx | My | Mz |
| 1 | 2015/02/03 17:15:20.010 | -0.170888 | 0.604472 | -0.932255 | -0.001003 | -0.003041 | -0.002908 |
| | 2015/02/03 17:15:20.020 | -0.018309 | 0.450270 | -0.321941 | -0.002569 | -0.001520 | -0.004744 |
| | ... | ... | ... | ... | ... | ... | ... |
| | 2015/02/03 17:15:25.030 | -0.180888 | 0.504472 | -0.732255 | -0.003003 | -0.005041 | -0.003908 |
| 2 | 2015/02/03 17:15:35.030 | -0.130888 | 0.704472 | -0.532255 | -0.005003 | -0.003341 | -0.002970 |
| | ... | ... | ... | ... | ... | ... | ... |
| | 2015/02/03 17:15:45.030 | -0.123888 | 0.794472 | -0.502255 | -0.015003 | -0.023341 | -0.032970 |
| ... | ... | ... | ... | ... | ... | ... | ... |

FIG. 20

| MOVEMENT DIRECTION/ GUIDANCE DIRECTION | SUPPORT MODE | LOAD TENDENCY OF USER | |
|---|---|---|---|
| | | AVERAGE LOAD IN MOVEMENT DIRECTION/ GUIDANCE DIRECTION DURING WALKING | AVERAGE LOAD IN DEVIATION DIRECTION OF CENTER OF GRAVITY DURING WALKING |
| FORWARD IN STRAIGHT LINE | GUIDANCE | Fy: 6 N | Mz: 0.5 Nm |
| FORWARD IN STRAIGHT LINE | MANUAL | Fy: 10 N | Mz: 1.0 Nm |
| BACKWARD IN STRAIGHT LINE | GUIDANCE | Fy: -6 N | Mz: -1.0 Nm |
| RIGHT TURN | MANUAL | Fy: 4 N | Mz: 5 Nm |
| ... | ... | ... | ... | ed
ROBOT AND METHOD FOR USE OF ROBOT

BACKGROUND

1. Technical Field

The present disclosure relates to a walking-support robot that supports a user with walking and a walking support method.

2. Description of the Related Art

In recent years, developed countries have faced a low birth rate and an aging population. Thus, the need for watching and living support for the elderly has been increasing. In particular, elderly people tend to be difficult to maintain QOL (Quality of Life) of in-home life due to deterioration of physical ability accompanying aging. It is important to maintain the muscle mass by continuing exercise more than a certain amount in order to prevent, for example, sarcopenia of the elderly and maintain the physical abilities. However, it is difficult for the elderly who have difficulty to go out due to a decline in physical ability and, thus, tend to retreat into their homes to maintain a certain amount of exercise. Therefore, they fall into a vicious circle of increased muscle mass loss. Recently, in light of this background, a walking-support robot that guides a user such as an elderly person to a destination has been developed.

Japanese Unexamined Patent Application Publication No. 2010-271911 describes a guiding mobile robot that calculates a moving speed on the basis of an input from a user and guides the user to a destination while standing aside the user.

SUMMARY

To provide more comfortable walking assistance to users, there is room for improvement in the robot described in Japanese Unexamined Patent Application Publication No. 2010-271911.

One non-limiting and exemplary embodiment provides a walking-support robot and a walking support method capable of providing more comfortable walking assistance to users.

In one general aspect, the techniques disclosed here feature a robot including a main body, a handlebar disposed on the main body, where the handlebar is grippable by a user, a detection unit that detects a load applied to the handlebar, a moving device including a rotating body, where the moving device moves the robot by controlling rotation of the rotating body, and a switching unit that switches a support mode for supporting the user with walking. The support mode includes a first mode in which the robot autonomously moves to guide the user who is walking and a second mode in which the robot moves in accordance with a first load detected by the detection unit. When the robot moves in the first mode, the switching unit switches the support mode from the first mode to the second mode on the basis of a second load detected by the detection unit.

As described above, according to the walking-support robot and the walking support method of the present disclosure, more comfortable walking support can be provided to users.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 6 illustrates a load tendency map according to the first exemplary embodiment of the present disclosure;

FIG. 8 illustrates an example of input waveform information of the handlebar load;

FIG. 20 illustrates a load tendency map according to a second exemplary embodiment of the present disclosure;

DETAILED DESCRIPTION

Figure 1:
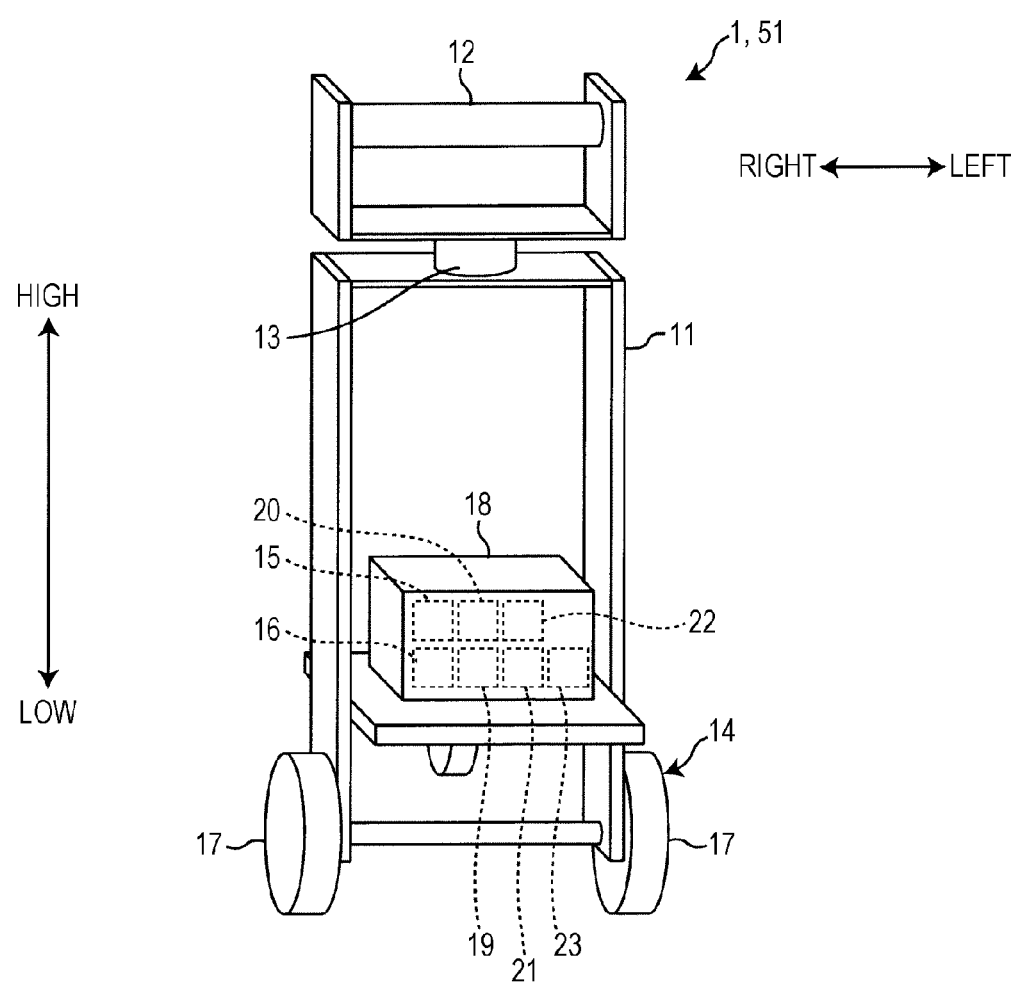
FIG. 1 is an external view of a walking-support robot according to a first exemplary embodiment of the present disclosure.

Underlying Knowledge Forming Basis of the Present Disclosure

In recent years, a walking-support robot having, as a mode for supporting a user with walking, a guidance mode and a manual mode has been developed. In guidance mode, a walking-support robot autonomously moves to guide a user to a destination. In manual mode, a walking-support robot moves on the basis of an input from a user. When the walking-support robot operates in guidance mode and if, for example, the user wants to deviate from the guidance route to go to a place other than the destination, the user needs to switch the support mode of the walking-support robot from guidance mode to manual mode.

The present inventors conceived the idea of switching the support mode from guidance mode to manual mode on the basis of the load applied to the handlebar of the walking-support robot so that the user can easily switch the support mode, which led to the present disclosure. Switching the support mode of a walking-support robot on the basis of the load applied to the handlebar is a novel technique in the related art found by the inventors.

In addition, in such a walking-support robot, the tendency of the load applied to the handlebar at the time of a user walking varies user by user. For example, elderly people with low physical abilities may have the center of gravity of the body that unstably sways left and right, In this case, since the value of the handlebar load in the right-left direction increases, the walking-support robot sometimes determines that the user is about to move to the right or the left. Therefore, the walking-support robot determines that the user is about to move away from the guidance route and, thus, switches the support mode from guidance mode to manual mode. As a result, the walking-support robot switches to the manual mode although the user wants the walking-support robot to guide themselves to the destination. As described above, in switching of the support mode based on the handlebar load, since the tendency of the load applied to the handlebar varies user by user, it is difficult to appropriately switch the support mode.

Accordingly, the present inventors have conceived the idea of determining whether the support mode is switched after correcting the value of the load applied to the handlebar in guidance mode on the basis of the load data of the user obtained in the past, which led to the present disclosure.

According to an aspect of the present disclosure, a walking-support robot includes a main body, a handlebar disposed on the main body, where the handlebar is grippable by a user, a detection unit that detects a load applied to the handlebar, a moving device including a rotating body, where the moving device moves the robot by controlling rotation of the rotating body, and a switching unit that switches a support mode for supporting the user with walking.

The support mode includes a first mode in which the robot autonomously moves to guide the user who is walking and a second mode in which the robot moves in accordance with a first load detected by the detection unit.

When the robot moves in the first mode, the switching unit switches the support mode from the first mode to the second mode on the basis of a second load detected by the detection unit.

Such a configuration can provide walking assistance that is more comfortable for the user than ever.

The robot may further include a generation unit that generates tendency data indicating a tendency of the load applied to the handlebar on the basis of past load data applied to the handlebar and obtained during movement of the robot, and a correction unit that corrects a value of the second load on the basis of the tendency data.

The switching unit may switch the support mode from the first mode to the second mode on the basis of the corrected value of the second load.

According to such a configuration, since the value of the load can be corrected on the basis of the load tendency data, walking assistance can be provided in accordance with the physical ability of the user.

The switching unit may switch the support mode from the first mode to the second mode if the corrected value of the second load is greater than a predetermined threshold value.

According to such a configuration, since the value of the load can be corrected on the basis of the load tendency data, walking assistance that is more comfortable for the user in accordance with the user's physical ability can be provided.

The generation unit may generate the tendency data for each of movement operations performed by the robot, and the correction unit may correct the value of the second load on the basis of the tendency data corresponding to the movement operation performed by the robot when the second load is detected.

According to such a configuration, since the load tendency data can be generated for each of the movement operations, the load tendency of the user can be more accurately identified. As a result, walking assistance that is more comfortable for the user can be provided.

The movement operations may include forward movement in a straight line, backward movement in a straight line, right-turn movement, and left-turn movement.

According to such a configuration, since the load tendency data can be generated for each of the movement operations performed by the walking-support robot, walking assistance that is more comfortable for the user can be provided.

The correction unit may correct the value of the second load on the basis of the tendency data if the tendency data corresponding to the movement operation performed by the robot reaches a predetermined threshold value or greater.

According to such a configuration, since the value of load can be corrected if the load tendency data corresponding to the movement operation performed by the walking-support robot reaches the predetermined threshold or greater, walking assistance that is more comfortable for the user can be provided.

The generation unit may generate the tendency data for each of the two types of support modes of the robot, and the correction unit may correct the value of the second load on the basis of the tendency data corresponding to the support mode of the robot when the second load is detected.

According to such a configuration, the load tendency data can be generated for each of the two types of support modes, and the load can be corrected on the basis of the load tendency of the user for each of the two types of support modes. As a result, walking assistance that is more comfortable for the user can be provided.

The tendency data may be a fluctuation frequency calculated by using the past load data, and the correction unit may correct the value of the second load by filtering out a component of the fluctuation frequency from the second load.

According to such a configuration, by using the fluctuation frequency as the load tendency data, the load tendency data in a wide range from fluctuation of small irregularity to fluctuation of large irregularity can be obtained, and the value of the load can be corrected. As a result, walking assistance that is more comfortable for the user in accordance with the physical ability of the user can be provided.

The load tendency data may be an average load value calculated by using the past load data, and the correction unit may correct the value of the load on the basis of the average load value.

According to such a configuration, by using the average load value as the load tendency data, the load steadily applied by each of the users can be acquired as the load tendency data and, thereafter, the value of the load can be corrected. As a result, walking assistance that is more comfortable for the user in accordance with the physical ability of the user can be provided.

The correction unit may correct the value of the load by subtracting the average load value from the load detected by the detection unit.

According to such a configuration, by subtracting the average load value from the load detected by the detection unit, the load steadily applied by each of the users can be reduced. As a result, walking assistance that is more comfortable for the user can be provided.

The switching unit may change the predetermined threshold value in accordance with usage conditions of the robot.

According to such a configuration, since the support mode can be switched in accordance with the usage conditions of the walking-support robot, walking assistance that is more comfortable for the user in accordance with the physical ability of the user can be provided.

The usage conditions may include one of a location of use and an operating time of the robot.

According to such a configuration, walking assistance that is more comfortable for the user in accordance with the physical ability of the user can be provided.

The robot may further includes
a storage unit that stores route information indicating guidance routes used by the robot to guide the user in the first mode.

The generation unit may generate the tendency data for each of the guidance routes indicated by the route information stored in the storage unit, and
the correction unit may correct the value of the second load on the basis of the tendency data corresponding to the guidance route on which the robot moves when the second load is detected.

According to such a configuration, the load tendency data of the user can be generated for each of guidance routes. As a result, walking assistance that is more comfortable for the user can be provided.

The robot may further include
an intention calculation unit that calculates a guidance intention of the robot in the first mode, and
an intention discovery unit that determines a movement intention of the user on the basis of the value of the second load.

The switching unit may switch the support mode on the basis of a difference between the calculated guidance intention and the determined movement intention of the user.

According to such a configuration, since the support mode can be switched on the basis of the difference between the movement intention of the user and the guidance intention of the walking-support robot, the user's intention can be easily determined. As a result, walking assistance that is more comfortable for the user can be provided.

The detection unit may detect a load applied in each of a plurality of axial directions, and the tendency data may indicate the tendency of the load in each of the axial directions.

According to such a configuration, by detecting a load applied in each of a plurality of axial directions, the load applied to the handlebar can be detected more accurately. As a result, the load tendency of the user can be more accurately acquired.

According to another aspect of the present disclosure, a method for use of a robot is provided. The robot operates in a support mode including a first mode in which the robot autonomously moves to guide a user who is walking and a second mode in which the robot moves in accordance with a first load applied to a handlebar of the robot, The method includes detecting a second load applied to the handlebar when the robot moves in the first mode and switching the support mode of the robot from the first mode to the second mode on the basis of the detected second load.

Such a configuration can provide walking assistance that is more comfortable for the user than ever.

Exemplary embodiments of the present disclosure are described below with reference to the accompanying drawings. Note that for ease of description, the constituent elements are enlarged in the drawings.

First Exemplary Embodiment

Overall Configuration

Figure 2:
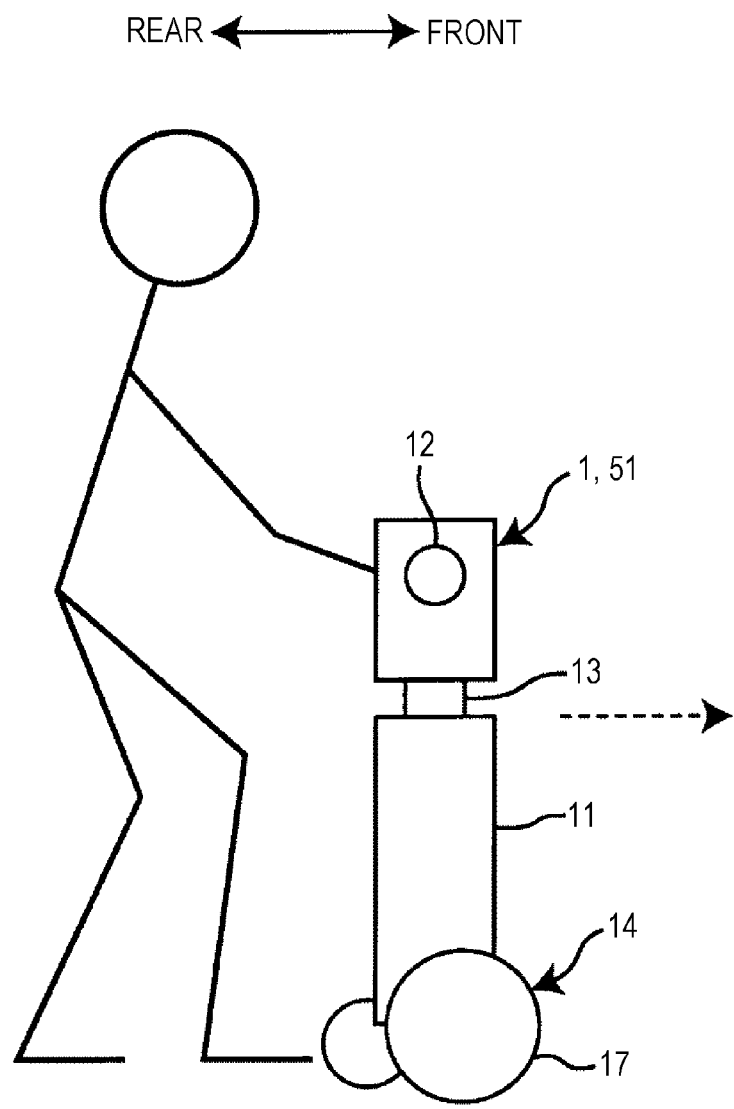
FIG. 2 illustrates a user who is walking with assistance provided by the walking-support robot according to the first exemplary embodiment of the present disclosure.

FIG. 1 is an external view of a walking-support robot 1 (hereinafter simply referred to as a "robot 1") according to a first exemplary embodiment. FIG. 2 illustrates a user who is walking with assistance provided by the robot 1.

As illustrated in FIGS. 1 and 2, the robot 1 includes a main body portion 11, a handlebar portion 12, a detection unit 13, a moving device 14 for moving the main body portion 11, a load tendency data generation unit 15, and a mode switching unit 16.

The robot 1 has the following two types of support modes for supporting a user with walking: a guidance mode (a first mode) for guiding a user to a destination along a guidance route and a manual mode (a second mode) for moving on the basis of an input from the user. As used herein, the term "guidance route" refers to a route from a departure point to the destination.

The guidance mode is a mode in which the robot 1 autonomously moves and guides the user who is walking. That is, in guidance mode, the robot 1 leads the user by the hand and guides the user to the destination along a guidance route.

The manual mode is a mode in which the robot 1 moves on the basis of an input from the user. That is, in manual mode, the robot 1 estimates the movement direction and the moving speed of the user on the basis of the input of the user and supports the user so that the user can walk stably. According to the first exemplary embodiment, the input from the user is the load applied to the handlebar portion 12, and the load is detected by the detection unit 13.

The handlebar portion 12 is provided on the upper portion of the main body portion 11. In addition, the handlebar portion 12 has a shape and is provided at a height such that the walking user can easily grip the handlebar portion 12 with their hands.

The detection unit 13 detects the load applied to the handlebar portion 12 by the user (the handlebar load) when the user holds the handlebar portion 12. More specifically, when the user grips the handlebar portion 12 and walks, the user applies a handlebar load to the handlebar portion 12. The detection unit 13 detects the direction and the magnitude of the handlebar load applied to the handlebar portion 12 by the user.

Figure 3:
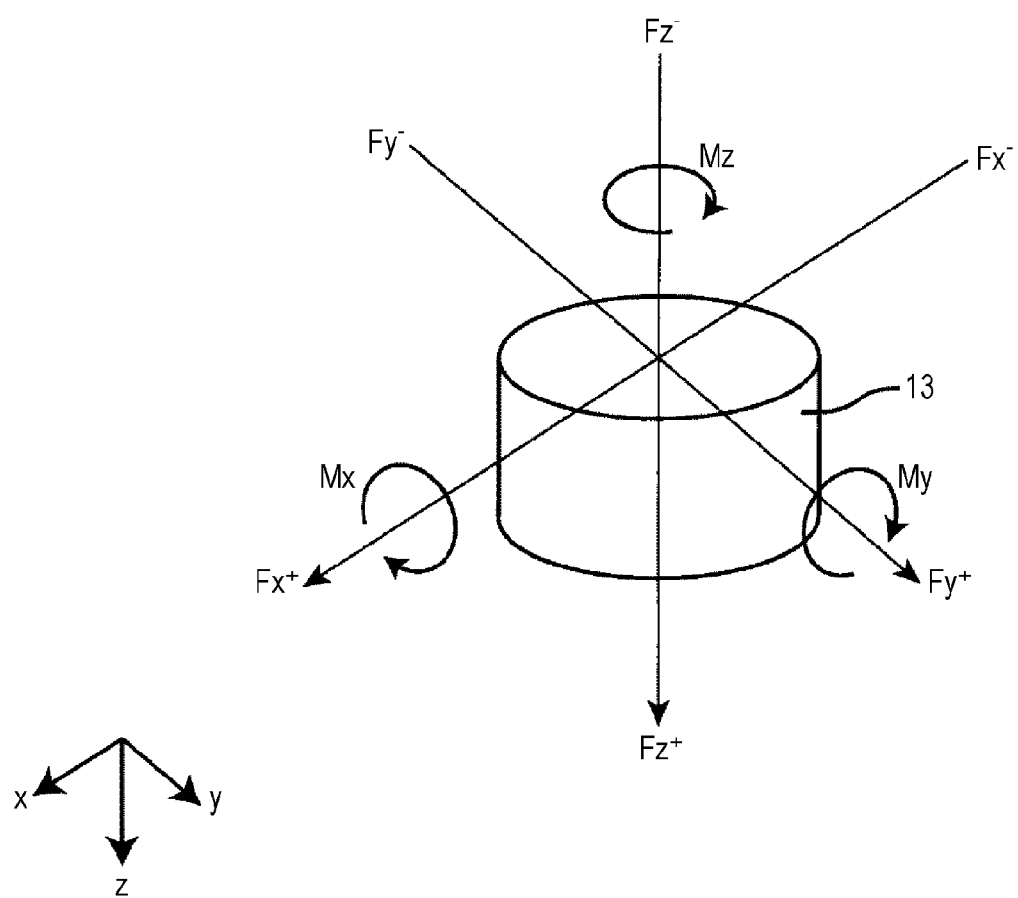
FIG. 3 illustrates the directions of a handlebar load detected by a detection unit according to the first exemplary embodiment of the present disclosure.

FIG. 3 illustrates the directions of the handlebar load detected by the detection unit 13. As illustrated in FIG. 3, the detection unit 13 is a six-axis force sensor capable of detecting forces applied in three axial directions orthogonal to one another and the moments about the three axes. The three axes orthogonal to one another are the x-axis extending in the right-left direction of the robot 1, the y-axis extending in the front-rear direction of the robot 1, and the z-axis extending in the height direction of the robot 1. The forces exerted in the three axial directions are a force Fx exerted in the x-axis direction, a force Fy exerted in the y-axis direction, and a force Fz exerted in the z-axis direction. According to the first exemplary embodiment, the force Fx exerted in the right direction is referred to as "Fx+", and the force FX exerted in the left direction is referred to as "Fx−". The force Fy exerted in the front direction is referred to as "Fy+", and the force Fy exerted in the backward direction is referred to as "Fy−". The force Fz exerted in the upward direction perpendicular to the walking plane is referred to as "Fz+", and the force Fz exerted in the downward direction perpendicular to the walking plane is referred to as "Fz−". The moments about the three axes are a moment Mx about the x-axis, a moment My about the y-axis, and a moment Mz about the z-axis.

The moving device 14 moves the main body portion 11. In manual mode, the moving device 14 moves the main body portion 11 on the basis of the magnitude and direction of the handlebar load (the force and the moment) detected by the detection unit 13. According to the first exemplary embodiment, in manual mode, the moving device 14 performs the control described below. As used herein, Fx, Fy, Fz, Mx, My, and Mz are also referred to as "load".

Forward Movement

The moving device 14 moves the main body portion 11 in the front direction when the force Fy+ is detected by the detection unit 13. That is, when the force Fy+ is detected by the detection unit 13, the robot 1 performs a forward movement. When the force Fy+ detected by the detection unit 13 increases while the robot 1 is moving forward, the moving device 14 increases the speed of moving the robot 1 in the forward direction. In contrast, when the force Fy+ detected by the detection unit 13 decreases while the robot 1 is moving forward, the moving device 14 decreases the moving speed of the robot 1 in the forward direction.

Backward Movement

The moving device 14 moves the main body portion 11 in the backward direction when the force Fy− is detected by the detection unit 13. That is, when the force Fy− is detected by the detection unit 13, the robot 1 performs a backward movement. When the force Fy− detected by the detection unit 13 increases while the robot 1 is moving backward, the moving device 14 increases the speed of moving the robot 1 in the backward direction. In contrast, when the force Fy− detected by the detection unit 13 decreases while the robot 1 is moving backward, the moving device 14 reduces the moving speed of the robot 1 in the backward direction.

Right Turn Movement

When the detection unit 13 detects the force Fy+ and the moment Mz+, the moving device 14 causes the main body portion 11 to turn right. That is, when the force Fy+ and the moment Mz+ are detected by the detection unit 13, the robot 1 performs a right turn movement. When the moment Mz+ detected by the detection unit 13 increases while the robot 1 is turning right, the turning radius of the robot 1 decreases. In addition, when the force Fy+ detected by the detection unit 13 increases while the robot 1 is turning right, the turning speed increases.

Left Turn Movement

When the detection unit 13 detects the force Fy+ and the moment Mz−, the moving device 14 causes the main body portion 11 to turn left. That is, when the force Fy+ and the moment Mz− are detected by the detection unit 13, the robot 1 performs a left turn movement. When the moment Mz− detected by the detection unit 13 increases while the robot 1 performs the left turn movement, the turning radius of the robot 1 decreases. In addition, when the force Fy+ detected by the detection unit 13 increases while the robot 1 is turning left, the turning speed increases.

Note that the control of the moving device 14 in manual mode is not limited to the above-described example. For example, the moving device 14 may control forward movement and backward movement of the robot 1 on the basis of the forces Fy and Fz. In addition, the moving device 14 may control the turn movement of the robot 1 on the basis of, for example, the moment Mx or My.

While the first exemplary embodiment has been described with reference to a six-axis force sensor serving as the detection unit 13 as an example, the detection unit 13 is not limited thereto. For example, a triaxial sensor or a distortion sensor may be used as the detection unit 13.

In guidance mode, the moving device 14 autonomously moves the main body portion 11 along a guidance route. More specifically, in guidance mode, the moving device 14 moves the main body portion 11 so as to lead the user to the destination along the guidance route. According to the first exemplary embodiment, in guidance mode, the moving device 14 controls the moving speed in accordance with the handlebar load input by the user. In addition, the moving device 14 may calculate the moving speed on the basis of the value of the handlebar load applied by the user ±α. For example, the value of ±α may be a fixed value, a value set for each of users, a value input by the user, a value set so that the moving speed in guidance mode is the same as the moving speed in manual mode, or a value set so that the moving speed in guidance mode is the same as a speed increased or decreased from the moving speed in manual mode. According to the first exemplary embodiment, the handlebar load used to calculate the moving speed in guidance mode is a load in the same direction as the guidance direction. Alternatively, the handlebar load used to calculate the moving speed in guidance mode may be a load in the forward direction (Fy+) or a load in the downward direction (Fz−). Still alternatively, the handlebar load used to calculate the moving speed in guidance mode may be a combination of a load in the same direction as the guidance direction, a load in the forward direction (Fy+), and a load in the downward direction (Fz−).

The moving device 14 includes wheels 17, which is a rotary body provided on a lower portion of the main body portion 11, and a drive unit 18 that drives and controls the wheels 17.

The wheels 17 supports the main body portion 11 so that the main body portion 11 is self-standing. The wheels 17 are rotatingly driven by the drive unit 18. Thus, for example, the main body portion 11 is moved in a direction of an arrow illustrated in FIG. 2 (the forward or backward direction) while being self-standing. While the first exemplary embodiment is described with reference to the moving device 14 including a moving mechanism using the two wheels 17 as an example, a rotating body other than a wheel (e.g., a moving belt or a roller) may be employed.

The drive unit 18 includes a load correction unit 19, a user movement intention discovery unit 20, a drive force calculation unit 21, an actuator control unit 22, and an actuator 23.

The load correction unit 19 corrects the handlebar load detected by the detection unit 13 on the basis of the load tendency of the user. More specifically, the load correction unit 19 corrects the value of the handlebar load detected by the detection unit 13 on the basis of the load tendency data generated by the load tendency data generation unit 15. According to the first exemplary embodiment, the fluctuation frequency is calculated from handlebar load data at the time of the user walking in the past, and the value of the handlebar load is corrected by filtering out the fluctuation frequency from the handlebar load detected by the detection unit 13. Furthermore, the load correction unit 19 may correct the value of the handlebar load on the basis of, for example, the location of use and the operating time of the robot 1 and the physical conditions of the user.

The user movement intention discovery unit 20 determines the movement intention of the user on the basis of the handlebar load corrected by the load correction unit 19 (hereinafter referred to as "corrected handlebar load"). The movement intention of the user includes the movement direction and the moving speed of the robot 1 that moves in response to the intention of the user. According to the first exemplary embodiment, the user movement intention discovery unit 20 determines the movement intention of the user by using the values of the corrected handlebar load in all movement directions. For example, when the force Fy+ detected by the detection unit 13 is greater than or equal to a predetermined first threshold value and the force My+ is less than a predetermined second threshold value, the user movement intention discovery unit 20 may determine that the movement intention of the user is a forward movement in a straight line. In addition, the user movement intention discovery unit 20 may determine the moving speed on the basis of the value of the corrected handlebar load in the Fz direction. Furthermore, when the force Fy+ detected by the detection unit 13 is greater than or equal to a predetermined third threshold value and the force My+ is greater than or equal to the predetermined second threshold value, the user movement intention discovery unit 20 may determine that the movement intention of the user is a right-turn movement. In addition, the user movement intention discovery unit 20 may determine the turning speed on the basis of the value of the corrected handlebar load in the Fz direction and determine the turning radius on the basis of the value of the corrected handlebar load in the My direction.

The drive force calculation unit 21 calculates the drive force in each of the manual mode and the guidance mode. In manual mode, the drive force calculation unit 21 calculates the drive force on the basis of the movement intention of the user determined from the information about the corrected handlebar load, that is, the movement direction and moving speed of the user. For example, when the movement intention of the user is a forward movement or a backward movement, the drive force is calculated so that the rotation amounts of the two wheels 17 are the same. However, if the movement intention of the user is a right-turn movement, the drive force is calculated so that the amount of rotation of the right wheel 17 of the two wheels 17 is larger than the amount of rotation of the left wheel 17. In addition, the magnitude of the drive force is calculated in accordance with the moving speed of the user. In guidance mode, the drive force calculation unit 21 calculates the drive force on the basis of the intention of the robot 1 to guide the user, which is calculated by the mode switching unit 16, that is, on the basis of the guidance direction and the guidance speed at which the robot 1 autonomously moves to guide the user. Since the calculation of the drive force on the basis of the guidance intention is similar to the calculation of the drive force on the basis of the movement intention of the user, description of the calculation is not repeated.

The actuator control unit 22 performs drive control of the actuator 23 on the basis of the information about the drive force calculated by the drive force calculation unit 21. In addition, the actuator control unit 22 can acquire the information about the rotation amounts of the wheels 17 from the actuator 23 and transmit the information about the rotation amounts of the wheels 17 to the drive force calculation unit 21 and a user load tendency extraction unit 30.

An example of the actuator 23 is a motor that rotationally drives the wheels 17. The actuator 23 is connected to the wheels 17 via, for example, a gear train or a pulley mechanism. The actuator 23 is driven and controlled by the actuator control unit 22 so as to control the rotation of the wheels 17.

The load tendency data generation unit 15 generates load tendency data of the user on the basis of the information about the handlebar load detected in the past. The load tendency data is data indicating the tendency for a specific handlebar load to be produced during a predetermined movement. Examples of the predetermined movement include forward movement in a straight line, backward movement, and turning. For example, when an elderly user with a bent-over posture grips the handlebar portion 12, the user leans against the robot 1. Accordingly, the handlebar load in the vertical downward direction with respect to the walking surface of the path on which the robot 1 moves, that is, the force Fz+ tends to increase. In addition, when the user who sways left and right while walking grips the handlebar portion 12, the handlebar load in the right-left direction, that is, the moment My tends to increase, despite the user attempting to move forward in a straight line. In this manner, the load tendency data generation unit 15 generates, from the past load data, the load tendency of the user for each of predetermined movements.

The load tendency data generation unit 15 generates load tendency data for the guidance mode and the support mode on the basis of past load data in guidance mode and in manual mode, respectively. According to the first exemplary embodiment, the load tendency data generation unit 15 generates load tendency data in guidance mode on the basis of the past load tendency data in guidance mode. Since the past load tendency data in guidance mode is acquired when the user is being guided by the robot 1, the user does not intentionally apply a load to the handlebar. Therefore, the guidance mode has an advantage that the load tendency of the user can be easily obtained from the past load tendency data. Note that the load tendency data in guidance mode may be generated on the basis of past load data in guidance mode and past load data in manual mode. Alternatively, the load tendency data in guidance mode may be generated on the basis of the past load tendency data in manual mode.

When the robot 1 is moving in guidance mode, the mode switching unit 16 switches the support mode from guidance mode to manual mode on the basis of the handlebar load detected by the detection unit 13, For example, when the robot 1 is guiding the user forward in a straight line (in the Fy+ direction) in guidance mode, the detection unit 13 detects the handlebar load in the right-turn direction (the Mz+ direction). At this time, if the value of the handlebar load in the right-turn direction is larger than a predetermined threshold value, the robot 1 determines that the user is going to make a right turn away from the guidance route and switches the support mode from guidance mode to manual mode. In the robot 1, the handlebar load used for determination of support mode switching is the handlebar load corrected on the basis of past load data. Correction of the handlebar load is described later.

Control Configuration of Walking-Support Robot

Figure 4:
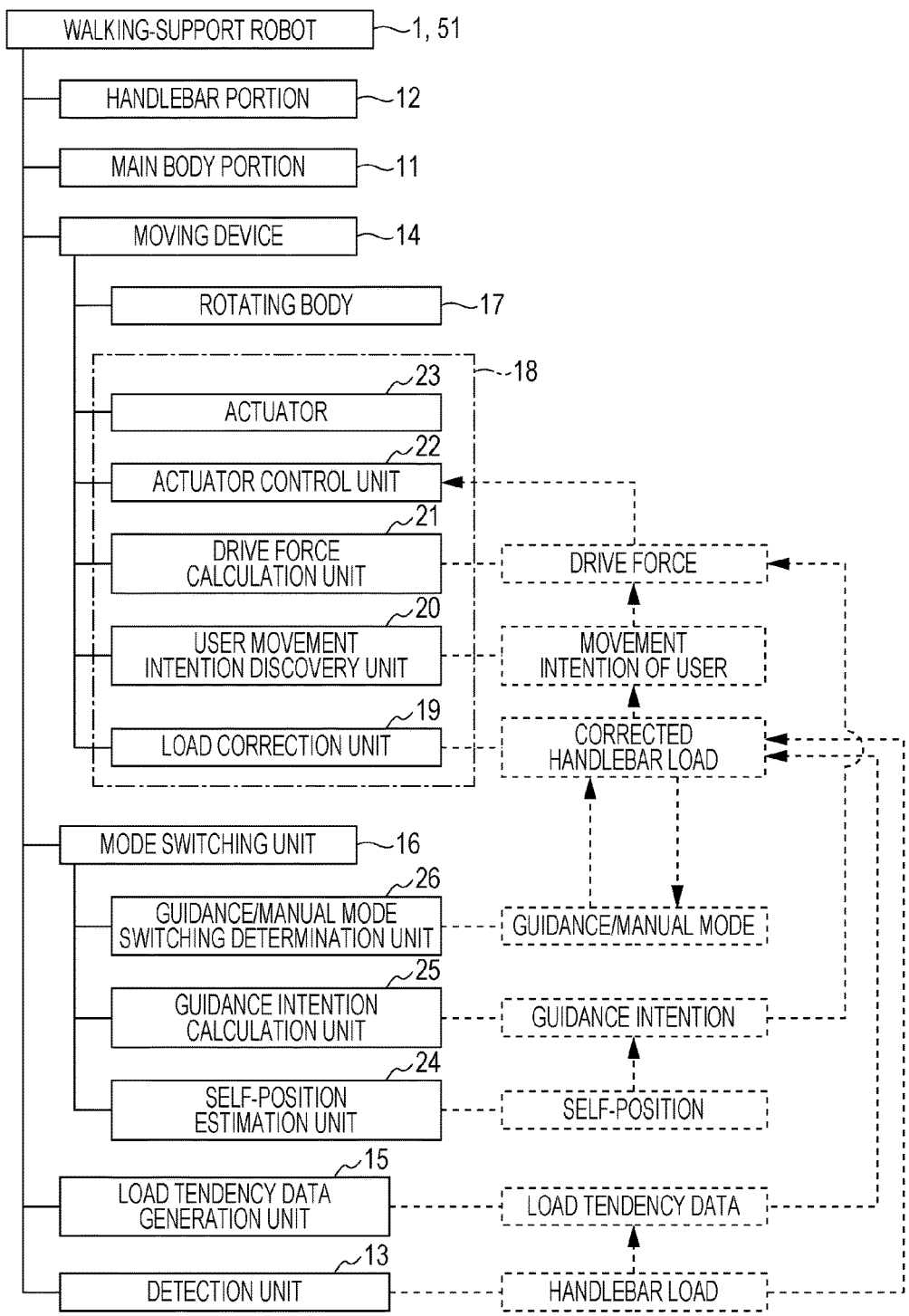
FIG. 4 is a control block diagram illustrating the main control configuration of the walking-support robot according to the first exemplary embodiment of the present disclosure.

The control configuration of a walking-support robot 1 having such a configuration for supporting a user with walking is described below. FIG. 4 is a control block diagram illustrating the main control configuration of the robot 1. Note that the control block diagram illustrated in FIG. 4 also illustrates the relationship between each of the control configurations and the information used in the control configuration.

The mode switching unit 16 is described in detail below. As illustrated in FIG. 4, the mode switching unit 16 includes a self-position estimation unit 24, a guidance intention calculation unit 25, and a guidance/manual mode switching determination unit 26.

The self-position estimation unit 24 estimates the self-position of the robot 1. The self-position estimation unit 24 estimates the self-position of the robot 1 by using, for example, an external sensor.

The guidance intention calculation unit 25 calculates the guidance intention of the robot 1 in guidance mode. The guidance intention includes a guidance direction and a guidance speed at which the robot 1 autonomously moves to guide the user. By using the destination information input by the user, the self-position information estimated by the self-position estimation unit 24, and the map information stored in the robot 1, the guidance intention calculation unit 25 calculates a guidance route extending from a departure point to a destination and calculates the guidance intention (the guidance direction and the guidance speed) of the robot 1.

In guidance mode, the guidance/manual mode switching determination unit 26 determines whether or not to switch the support mode from guidance mode to manual mode on the basis of the detected handlebar load. More specifically, in guidance mode, if the value of the handlebar load corrected by the load correction unit 19 is larger than a predetermined threshold value, the guidance/manual mode switching determination unit 26 determines to switch the support mode from guidance mode to manual mode.

The control of the walking-support robot is described below. As illustrated in FIG. 4, the detection unit 13 detects a handlebar load applied to the handlebar portion 12. The information about the handlebar load detected by the detection unit 13 is transmitted to the load correction unit 19. In addition, the load correction unit 19 acquires, from the guidance/manual mode switching determination unit 26, the guidance/manual mode information indicating whether the current support mode is a guidance mode or a manual mode. The load correction unit 19 corrects the value of the handlebar load detected by the detection unit 13 on the basis of the information about the current support mode and the load tendency data generated by the load tendency data generation unit 15.

When the robot 1 is operating in manual mode, information about the corrected handlebar load is transmitted to the user movement intention discovery unit 20. The user movement intention discovery unit 20 determines the movement intention of the user (the movement direction and the moving speed) on the basis of the information about the corrected handlebar load. Information about the determined movement intention of the user is transmitted to the drive force calculation unit 21.

When the robot 1 is operating in guidance mode, the information about the correction handlebar load is transmitted to the guidance/manual mode switching determination unit 26. The guidance/manual mode switching determination unit 26 determines whether or not to switch the support mode from guidance mode to manual mode on the basis of the information about the corrected handlebar load.

When the guidance/manual mode switching determination unit 26 switches the support mode from guidance mode to manual mode, the information about the movement intention of the user determined by the user movement intention discovery unit 20 is transmitted to the drive force calculation unit 21. The drive force calculation unit 21 calculates the drive force on the basis of the information about the determined movement intention of the user.

However, if the guidance/manual mode switching determination unit 26 maintains guidance mode, the information about the guidance intention of the robot 1 calculated by the guidance intention calculation unit 25 is transmitted to the drive force calculation unit 21. The drive force calculation unit 21 calculates the drive force on the basis of the calculated guidance intention information.

Note that the guidance intention information is calculated by the guidance intention calculation unit 25 on the basis of the destination information input by the user, the self-position information estimated by the self-position estimation unit 24, and the map information.

Information about the calculated drive force is transmitted to the actuator control unit 22. The actuator control unit 22 performs drive control of the actuator 23 on the basis of the information about the drive force calculated by the drive force calculation unit 21. The actuator 23 is driven and controlled by the actuator control unit 22 so as to rotationally drive the wheels 17 and move the main body portion 11.

In addition, as illustrated in FIG. 4, the information about the handlebar load detected by the detection unit 13 is transmitted to the load tendency data generation unit 15. The information about the handlebar load detected by the detection unit 13 is also used to generate and update the load tendency data. According to the first exemplary embodiment, the load tendency data generation unit 15 generates the load tendency data for each of the two support modes (guidance mode and manual mode).

Figure 5:
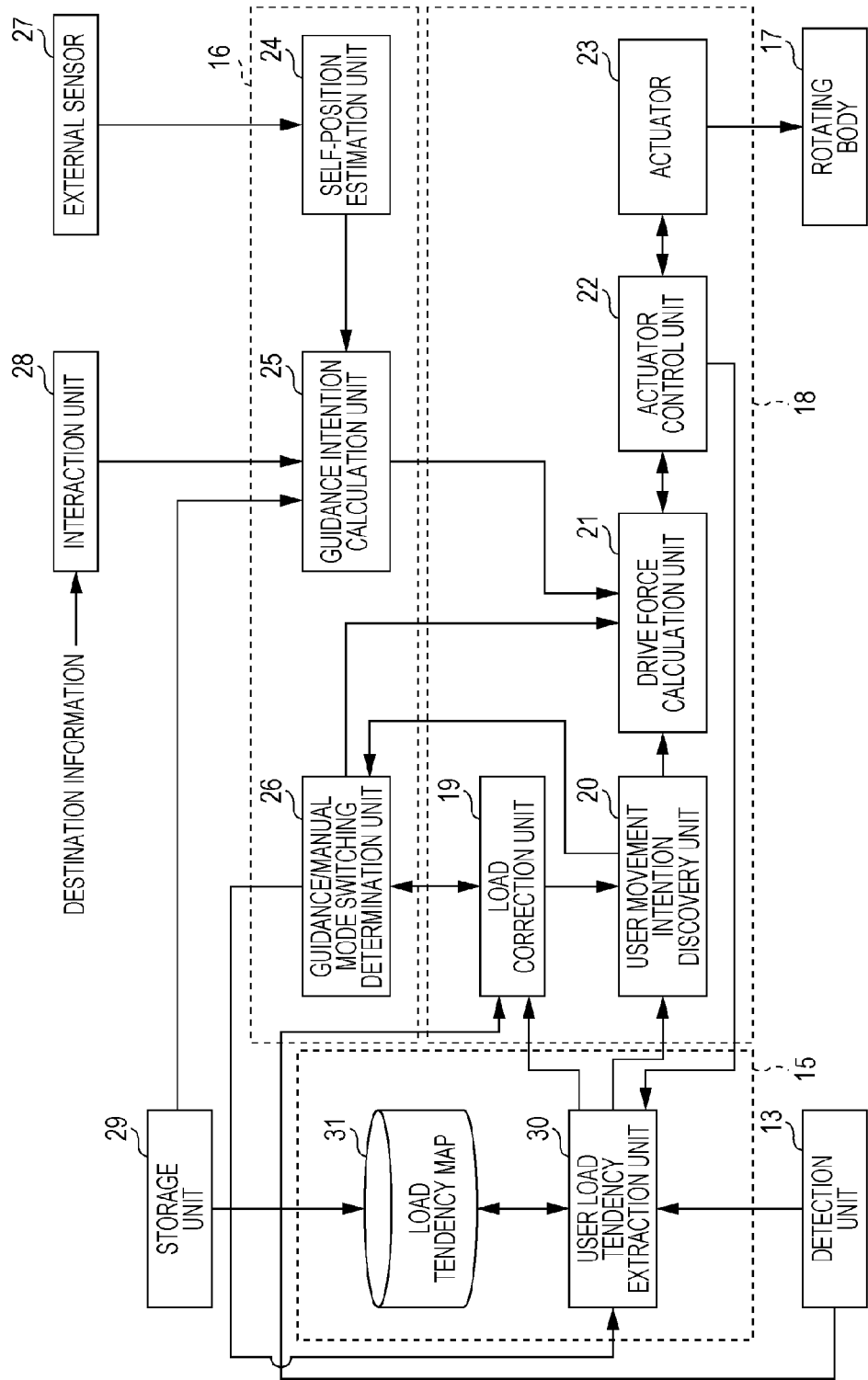
FIG. 5 is a control block diagram illustrating a detailed walking support control configuration of the walking-support robot according to the first exemplary embodiment of the present disclosure.

The walking support control performed by the robot 1 is described in more detail below with reference to FIG. 5. FIG. 5 is a control block diagram illustrating a detailed walking-support control configuration of the robot 1.

As illustrated in FIG. 5, the robot 1 includes an external sensor 27 that acquires external information, an interaction unit 28 that receives the input destination information, and a storage unit 29 that stores map information.

The external sensor 27 is a sensor that acquires external information. The external sensor 27 may be, for example, an LRF (Laser Range Finder), an LIDAR (Laser Imaging Detection and Ranging) sensor, a camera, a depth camera, a stereo camera, a sonar, a RADAR sensor, or any combinations thereof. The information acquired by the external sensor 27 is transmitted to the self-position estimation unit 24 and used to estimate the self-position of the robot 1.

The interaction unit 28 is a unit used by the user to input the destination information regarding the destination to which the user intends to be guided in guidance mode of the robot 1. An example of the interaction unit 28 is a voice input device or a touch panel. The destination information input via the interaction unit 28 is transmitted to the guidance intention calculation unit 25 and used to calculate a guidance route and a guidance intention. The destination information includes, for example, a destination, an arrival time, a guidance route, and the purpose (for example, having a meal or going to bed).

The storage unit 29 stores map information. The storage unit 29 stores route information indicating a guidance route for guiding the user in guidance mode. The map information stored in the storage unit 29 may be input in advance or may be generated by using the external sensor 27. Note that the map information can be generated by using the Simultaneous Localization And Mapping (SLAM) technology. The map information stored in the storage unit 29 is transmitted to the guidance intention calculation unit 25 and is used to calculate a guidance intention. In addition, the map information stored in the storage unit 29 is transmitted to the load tendency data generation unit 15.

The control performed by the mode switching unit 16 when guidance mode is set is described below. The interaction unit 28 acquires the destination information input by the user and transmits the destination information to the guidance intention calculation unit 25. Thereafter, the self-position of the robot 1 is estimated on the basis of the external information acquired from the external sensor 27 by the self-position estimation unit 24. The self-position estimation unit 24 transmits the estimated self-position information to the guidance intention calculation unit 25.

The guidance intention calculation unit 25 reads the map information from the storage unit 29. The guidance intention calculation unit 25 calculates a guidance route on the basis of the destination information input by the user, the self-position information of the robot 1, and the map information read from the storage unit 29. In addition, the guidance intention calculation unit 25 calculates a guidance intention (a guidance direction and a guidance speed). The guidance intention calculation unit 25 transmits the information about the calculated guidance intention to the drive force calculation unit 21.

The drive force calculation unit 21 calculates the drive force on the basis of the guidance intention. Thereafter, on the basis of the calculated drive force, the actuator control unit 22 controls the actuator 23 to rotationally drive the rotating body (the wheels) 17.

The load tendency data generation unit 15 is described in detail below. The load tendency data generation unit 15 includes a user load tendency extraction unit 30 that extracts the load tendency of the user and a load tendency map 31 that stores the load tendency data of the user.

The user load tendency extraction unit 30 extracts the load tendency of the user corresponding to the movement direction/guidance direction of the user. More specifically, the user load tendency extraction unit 30 extracts, from the load tendency map 31, the load tendency data of the user corresponding to the movement direction/guidance direction of the user. For example, in manual mode, if the movement direction of the user is a forward direction in a straight line, the user load tendency extraction unit 30 extracts, from the load tendency map 31, the load tendency of the user corresponding to the forward movement, in a straight line, in manual mode. In contrast, in guidance mode, if the guidance direction of the robot 1 is the forward direction in a straight line, the user load tendency extraction unit 30 extracts, from the load tendency map 31, the load tendency of the user corresponding to the forward movement in a straight line in guidance mode. The user load tendency extraction unit 30 transmits, to the load correction unit 19, the load tendency data extracted from the load tendency map 31.

In addition, the user load tendency extraction unit 30 generates load tendency data of the user on the basis of the information about the handlebar load detected by the detection unit 13 and the information about the rotation amounts of the wheels 17 acquired by the actuator control unit 22.

The generated load tendency data is transmitted to the load tendency map 31. As a result, the load tendency data in the load tendency map 31 is updated. According to the first exemplary embodiment, the load tendency data is independently generated for guidance mode and manual mode.

The load tendency map 31 is a database that stores the user load tendency data for the user movement direction/ guidance direction for each of the two types of support modes. That is, the load tendency map 31 stores the load tendency data for each of the movements, such as forward movement in a straight line, backward movement in a straight line, and a right-turn movement, in each of guidance mode and manual mode. FIG. 6 illustrates the load tendency map 31. As illustrated in FIG. 6, according to the first exemplary embodiment, the load tendency map 31 stores, as the load tendency data of the user, the fluctuation frequencies in the movement direction and guidance direction at the time of walking and the fluctuation frequency in the direction in which the center of gravity deviates at the time of walking. In addition, the load tendency map 31 may store the data of the fluctuation frequency calculated in the past.

Although not illustrated in FIG. 6, the load tendency map 31 may store data related to the location of use and the operating time of the robot 1 and the physical conditions of the user. Furthermore, the load tendency map 31 may store past data such as the departure place, the destination, the guidance route, and the guidance time duration. These data may be used to calculate the corrected handlebar load or to set up a predetermined threshold value used when guidance mode is switched to manual mode.

Generation of Load Tendency Data

Figure 7:
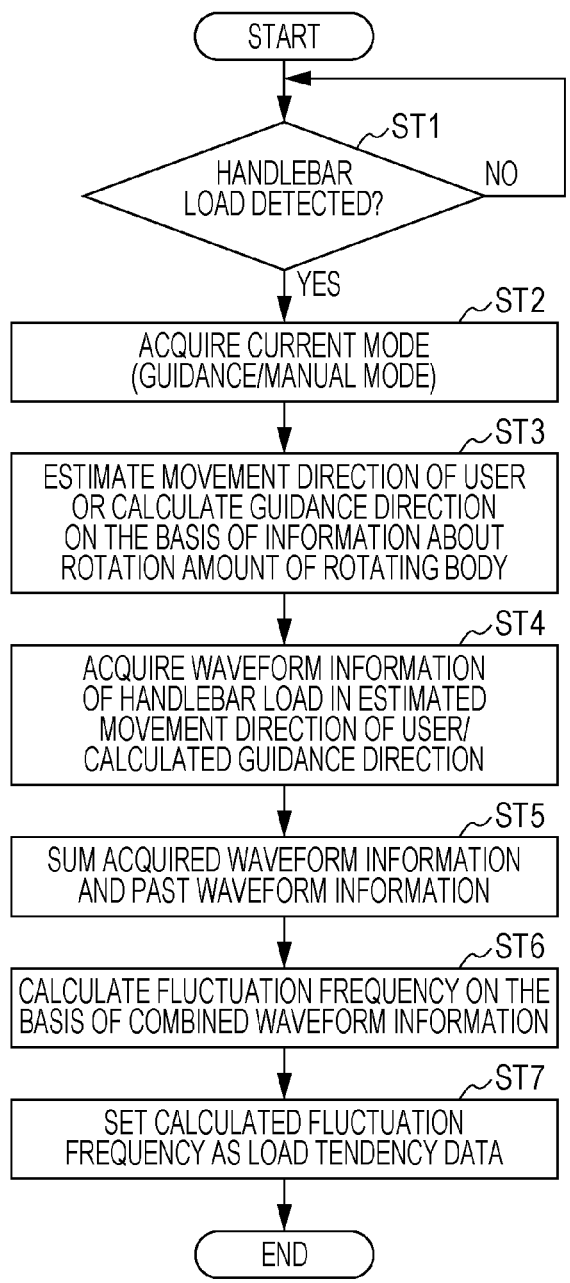
FIG. 7 is a flowchart of an exemplary process of generating load tendency data according to the first exemplary embodiment of the present disclosure.

Generation of the load tendency data is described with reference to FIG. 7. FIG. 7 is a flowchart of an exemplary process of generating load tendency data.

As illustrated in FIG. 7, in step ST1, it is determined whether a handlebar load is detected by the detection unit 13. That is, in step ST1, it is determined whether the user grips the handlebar portion 12. If the detection unit 13 detects the handlebar load, the processing proceeds to step ST2. However, if the detection unit 13 does not detect the handlebar load, the process in step ST1 is repeated.

In step ST2, the user load tendency extraction unit 30 acquires information about the current support mode from the guidance/manual mode switching determination unit 26. More specifically, the user load tendency extraction unit 30 determines whether the current support mode of the robot 1 is guidance mode or manual mode.

In step ST3, the user load tendency extraction unit 30 determines the movement direction of the user on the basis of the information about the current support mode and the information about the rotation amounts of the wheels 17 or calculates the guidance direction. More specifically, if, in ST1, a change in the handlebar load is detected, the user load tendency extraction unit 30 acquires information about the current support mode from the guidance/manual mode switching determination unit 26. In this manner, the user load tendency extraction unit 30 determines whether the current support mode is the guidance mode or manual mode. Thereafter, the actuator control unit 22 acquires information about the rotation amounts of the wheels 17. The information about the rotation amounts acquired by the actuator control unit 22 is transmitted to the user load tendency extraction unit 30. In manual mode, the user load tendency extraction unit 30 determines the movement direction of the user on the basis of the information about the rotation amounts of the wheels 17, that is, the rotation direction and the rotational speed of the wheel. However, in guidance mode, the user load tendency extraction unit 30 calculates the guidance direction.

According to the first exemplary embodiment, the user load tendency extraction unit 30 determines the movement direction of the user on the basis of the rotation amounts of the two wheels 17 disposed on the left and right. For example, if the rotation amount of the right wheel 17 is greater than the rotation amount of the left wheel 17, the user load tendency extraction unit 30 may determine that the user is turning to the left. When the rotational speeds of the left and right wheels 17 are the same and if the left and right wheels 17 rotate in the forward direction, the user load tendency extraction unit 30 may determine that the robot 1 is moving forward in a straight line. Note that the guidance direction may be calculated by the guidance intention calculation unit 25 or the self-position estimation unit 24.

In step ST4, the user load tendency extraction unit 30 acquires the waveform information of the handlebar load of the user in the estimated movement direction or the calculated guidance direction. For example, if the movement direction of the user is the Fy+ direction, the waveform information of the handlebar load in the movement direction of the user is the waveform information of the handlebar load in the Fz direction or the waveform information of the moment in the My direction. However, the waveform information of the handlebar load in the movement direction is not limited thereto.

In step ST5, the user load tendency extraction unit 30 sums the acquired waveform information of the handlebar load and the waveform information of the past handlebar load. For example, the past waveform information is stored in the load tendency map 31. The user load tendency extraction unit 30 reads the past waveform information from the load tendency map 31 and adds the acquired current waveform information to the past waveform information. FIG. 8 illustrates an example of the input waveform information of the handlebar load. As illustrated in FIG. 8, the waveform information of the handlebar load detected so far is stored in the load tendency map 31.

In step ST6, the user load tendency extraction unit 30 calculates the fluctuation frequency on the basis of the summed waveform information. More specifically, the user load tendency extraction unit 30 calculates the fluctuation frequency by analyzing the frequency of the handlebar load in the determined movement direction of the user or the calculated guidance direction.

Figure 9A:
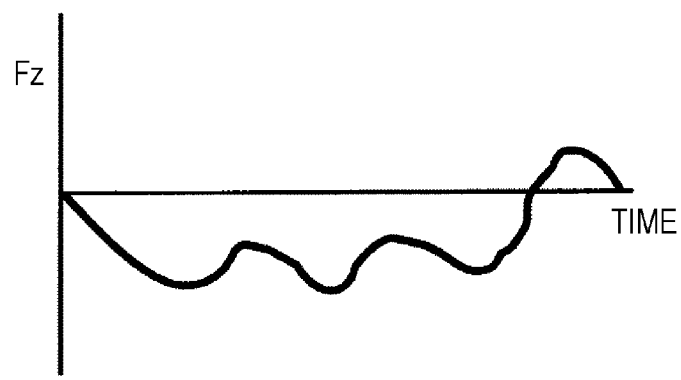
FIG. 9A illustrates an example of waveform information of the load data in an Fz direction when a user moves forward in a straight line in guidance mode.
Figure 9B:
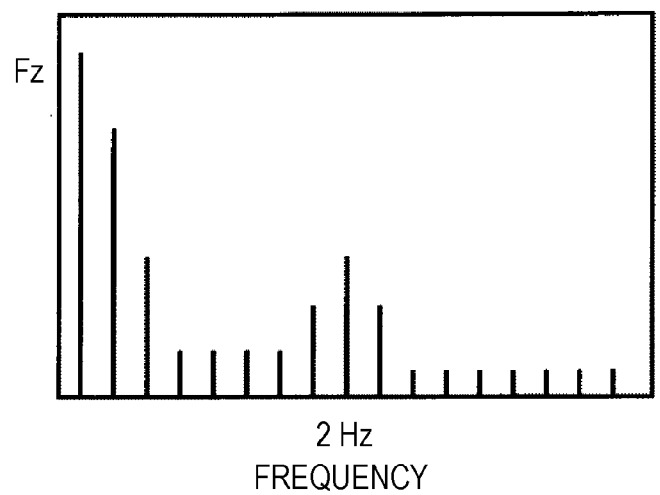
FIG. 9B illustrates a frequency component of the load data in the Fz direction illustrated in FIG. 9A.
Figure 10A:
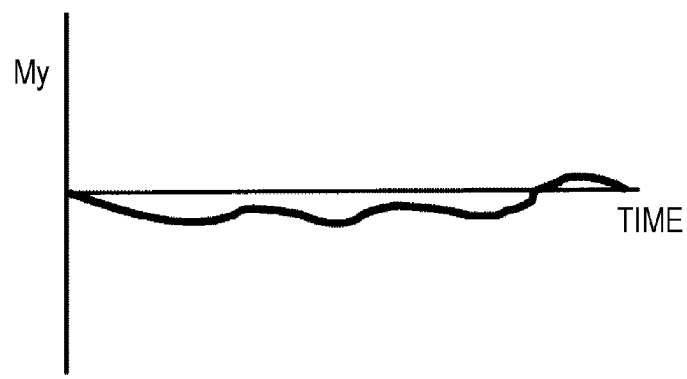
FIG. 10A illustrates an example of waveform information of the load data in an My direction when the user moves forward in a straight line in guidance mode.
Figure 10B:
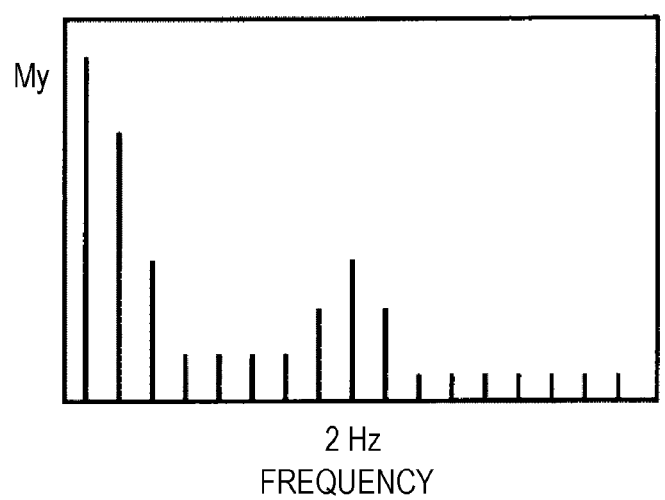
FIG. 10B illustrates a frequency component of the load data in the My direction illustrated in FIG. 10A.

As an example, calculation of the fluctuation frequency when the user with low physical ability is guided in the forward direction in guidance mode is described below. FIG. 9A illustrates an example of the waveform information of the load data in the Fz direction when the user moves forward in a straight line in guidance mode. FIG. 9B illustrates a frequency component of the load data in the Fz direction illustrated in FIG. 9A. FIG. 10A illustrates an example of waveform information of the load data in the My direction when the user moves forward in a straight line in guidance mode. FIG. 10B illustrates a frequency component of the load data in the My direction illustrated in FIG. 10A. Note that FIG. 9A illustrates the waveform of the load data for three steps but, in reality, the frequency analysis is performed on the waveform of the load data for 10 steps.

Since the user with low physical ability sways left and right while walking, the handlebar load is not stable even if the robot 1 moves forward in a straight line at a constant speed. Therefore, as illustrated in FIG. 9A, fluctuation occurs in the waveform information of the load data in the height direction of the robot 1, that is, in the Fz direction. As used herein, the term "fluctuation" refers to a component of waveform information that fluctuates and is not stable and, more specifically, fluctuation from the average value of load data.

In this case, although the user intends to move forward in a straight line, the user walks while finely adjusting the movement direction to the left and right, since the robot 1 moves in the left and right directions. According to the first exemplary embodiment, the user load tendency extraction unit 30 assumes that the user is swaying left and right while walking and uses the fluctuation component of the load as the load tendency data in order to correct the handlebar load. An example of the processing performed by the user load tendency extraction unit 30 is described below.

The user load tendency extraction unit 30 performs frequency analysis on the waveform information of the load data in the Fz direction illustrated in FIG. 9A and calculates the frequency component of the load data as illustrated in FIG. 9B. In this manner, when the user is moving forward in a straight line in guidance mode, the user load tendency extraction unit 30 can identify that there is a fluctuation frequency of 2 Hz in the Fz direction, as illustrated in FIG. 9B.

In addition, as illustrated in FIG. 10A, fluctuation occurs in the waveform information of the load data of the user with low physical ability in the My direction. The user load tendency extraction unit 30 performs frequency analysis on the load data in the My direction illustrated in FIG. 10A and calculates the frequency component of the load data as illustrated in FIG. 10B. In this manner, when the user is guided in the forward direction in guidance mode, the user load tendency extraction unit 30 can identify that there is a fluctuation frequency of 2 Hz in the My direction, as illustrated in FIG. 10B.

Figure 11A:
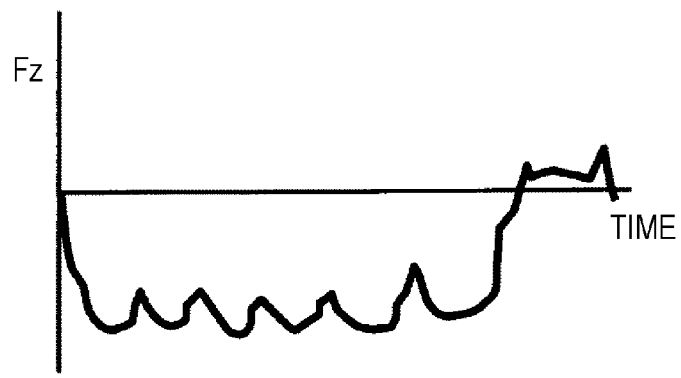
FIG. 11A illustrates an example of waveform information of load data in the Fz direction when the user turns right in guidance mode.
Figure 11B:
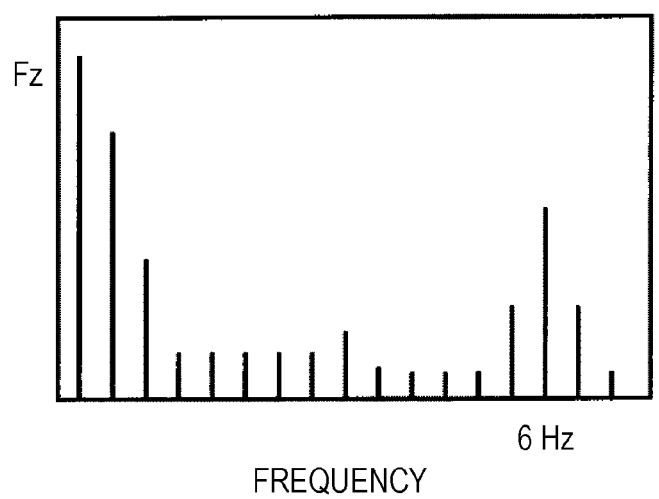
FIG. 11B illustrates a frequency component of the load data in the Fz direction illustrated in FIG. 11A.

As another example, calculation of the fluctuation frequency during a right-turn movement of the user with low physical ability is described below. FIG. 11A illustrates an example of waveform information of load data in the Fz direction during a right-turn movement of the user in guidance mode. FIG. 11B illustrates a frequency component of the load data in the Fz direction illustrated in FIG. 11A.

Similarly, as illustrated in FIG. 11A, fluctuation occurs in the waveform information of the load data in the Fz direction at the time of a right-turn movement of the user with low physical ability in guidance mode. The user load tendency extraction unit 30 performs frequency analysis on the load data in the Fz direction illustrated in FIG. 11A and calculates the frequency component of the load data as illustrated in FIG. 11B. When the user is turning to the right in guidance mode, the user load tendency extraction unit 30 can identify that there is a fluctuation frequency of 6 Hz in the Fz direction, as illustrated in FIG. 11B.

In this way, in step ST6, the user load tendency extraction unit 30 calculates the fluctuation frequency from the sum of the waveform information of the handlebar load in the estimated movement direction of the user and the handlebar load in the calculated guidance direction.

Referring back to FIG. 7, in step ST7, the user load tendency extraction unit 30 sets the fluctuation frequency calculated in step ST6 as load tendency data. More specifically, the user load tendency extraction unit 30 updates the load tendency data of the user in the load tendency map 31 to the fluctuation frequency calculated in step ST6.

As described above, according to the first exemplary embodiment, by performing the processing in steps ST1 to ST7, the fluctuation frequency of the handlebar load of the user can be calculated and used as the load tendency data. In addition, according to the first exemplary embodiment, the load tendency data can be generated for each of the movement operations.

While the processing in steps ST5 and ST6 has been described with reference to the example in which the fluctuation frequency calculated on the basis of the waveform information obtained by summing the acquired waveform information of the handlebar load and the waveform information of the past handlebar load is set as the load tendency data, the processing is not limited thereto. For example, after summing the fluctuation frequency calculated on the basis of the past waveform information and the fluctuation frequency calculated on the basis of the waveform information of the acquired handlebar load, the average may be calculated, and the calculated average value of the fluctuation frequency may be used as the load tendency data. Alternatively, the median or the mode value of the fluctuation frequency may be calculated on the basis of the fluctuation frequency calculated from the waveform information of the obtained handlebar load and the past fluctuation frequency, and the median value or the mode value of the fluctuation frequency may be used as the load tendency data. Still alternatively, the average value, the median value, and the mode value of the fluctuation frequency may be combined, and the combined value may be used as the load tendency data. Yet still alternatively, the most recently calculated fluctuation frequency may be used as the load tendency data. The above-described load tendency data may be used appropriately in accordance with the circumstances and the purposes. For example, for users having a few past fluctuation frequency data stored in the load tendency map 31, the most recently calculated fluctuation frequency may be used as the load tendency data. In contrast, for users having a large amount of past fluctuation frequency data stored in the load tendency map 31, the average value, the median value, or the mode value of the fluctuation frequency may be used as the load tendency data.

Determination of Movement Intention of User

Figure 12:
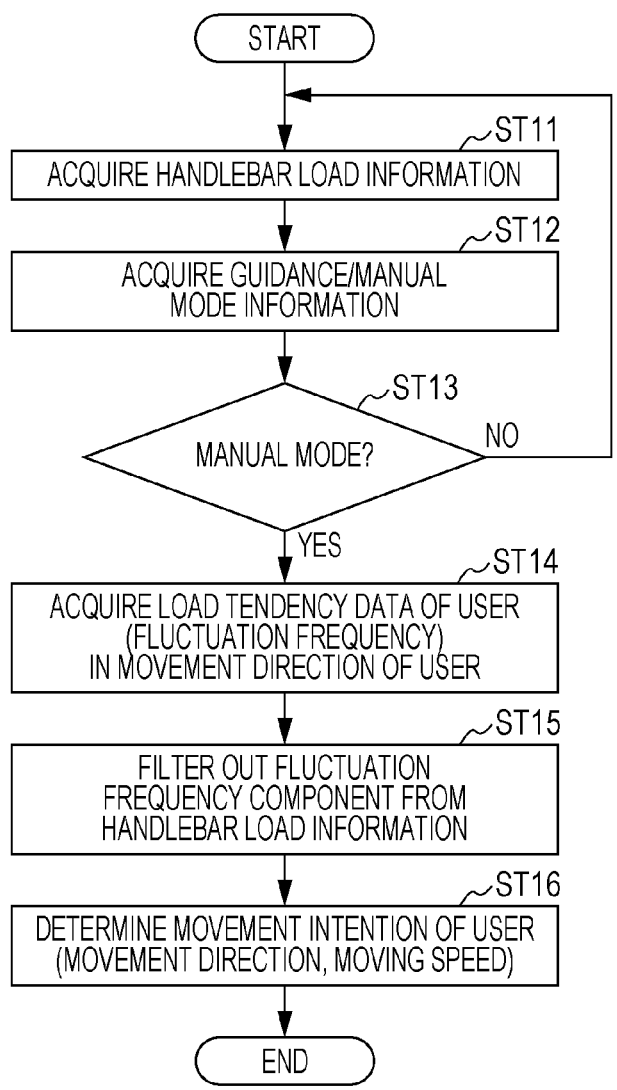
FIG. 12 is a flowchart of an exemplary determination process of the movement intention of the user according to the first exemplary embodiment of the present disclosure.

Determination of the movement intention of the user is described with reference to FIG. 12. FIG. 12 is a flowchart of an exemplary determination process of the movement intention of the user.

As illustrated in FIG. 12, in step ST11, the load correction unit 19 acquires the information about the handlebar load detected by the detection unit 13.

In step ST12, the user load tendency extraction unit 30 acquires information about the guidance/manual mode from the guidance/manual mode switching determination unit 26. More specifically, the user load tendency extraction unit 30 acquires the information about the current support mode from the guidance/manual mode switching determination unit 26.

In step ST13, it is determined whether the current support mode is manual mode. In step ST13, when the robot 1 is operating in guidance mode, it is determined whether or not to switch to the manual mode. If the current support mode is the manual mode, the processing proceeds to step ST14. However, if the current support mode is not manual mode, that is, the guidance mode is to be maintained, the processing returns to step ST11. Note that the determination process as to whether the guidance mode is switched to manual mode is described below.

In step ST14, the user load tendency extraction unit 30 acquires the load tendency data of the user from the load tendency map 31. More specifically, the user load tendency extraction unit 30 acquires, from the load tendency map 31, a fluctuation frequency in the current movement direction of the user. The user load tendency extraction unit 30 transmits the information about the fluctuation frequency to the load correction unit 19 as the load tendency data. Note that the current movement direction of the user can be estimated by acquiring the information about the rotation amounts of the wheels 17 from the actuator control unit 22.

In step ST15, the load correction unit 19 filters out the fluctuation frequency component acquired in step ST14 from the handlebar load acquired in step ST11. In this manner, the load correction unit 19 corrects the value of the handlebar load detected by the detection unit 13. The information about the corrected handlebar load obtained by the load correction unit 19 is transmitted to the user movement intention discovery unit 20. Note that the load correction unit 19 may correct the handlebar load by using the load tendency data in at least one of guidance mode and manual mode. Alternatively, the load correction unit 19 may correct the handlebar load by combining the load tendency data in guidance mode and the load tendency data in manual mode.

Furthermore, the load correction unit 19 may correct the value of the handlebar load on the basis of the location of use and the operating time of the robot 1 and the physical conditions of the user. In this case, the user load tendency extraction unit 30 extracts, from the load tendency map 31, data relating to the location of use and the operating time of the robot 1 and the physical conditions of the user and transmits the data to the load correction unit 19. For example, the load correction unit 19 may correct the handlebar load so that the handlebar load in the case where the robot 1 is used in the living room or when the user is in poor physical condition is smaller than that in the case where the robot 1 is used in a corridor or when the user is in good physical condition.

In step ST16, the user movement intention discovery unit 20 determines the movement intention of the user on the basis of the corrected handlebar load acquired in step ST15. More specifically, the user movement intention discovery unit 20 determines the movement direction and moving speed of the user on the basis of the magnitudes of the forces in the Fx, Fy, Fz, Mx, My, and Mz directions of the corrected handlebar load.

As described above, according to the first exemplary embodiment, by performing the processing in steps ST11 to ST16, the fluctuation frequency component is filtered out from the waveform information of the handlebar load of the user, and the movement intention of the user is determined on the basis of the obtained information about the corrected handlebar load. Note that even in guidance mode, the movement intention of the user may be determined. In this case, the process in step ST13 can be skipped.

According to the first exemplary embodiment, in filtering, correction may be performed so as to cut out all of the frequency components corresponding to the fluctuation portion and, thus, remove all of the fluctuation components. Alternatively, correction may be performed on the load data at the time of walking so that the percentage of the fluctuation components decreases.

Furthermore, in addition to using only the load tendency data of the user for correction, the load correction unit 19 may compare the load tendency data of the user with the average load tendency data of a plurality of users and change the ratio of correction so that the difference is reduced. To calculate the average among a plurality of users, the average may be calculated for each of groups classified by any combinations of, for example, the age, sex, place, walking ability (the walking speed, walking rate, stride length, standing posture, left-and-right swaying).

Figure 13A:
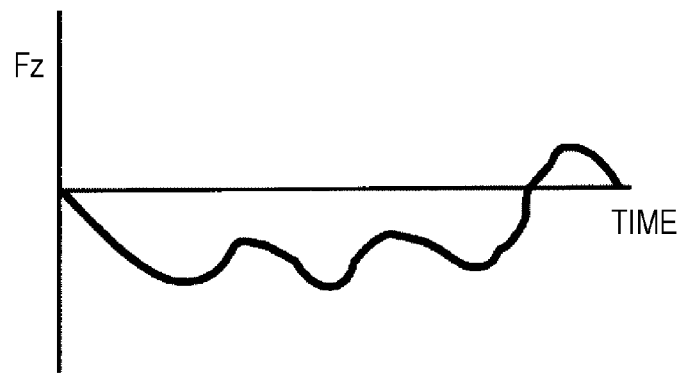
FIG. 13A illustrates an example of the waveform information of the load data in the Fz direction when the user moves forward in a straight line in manual mode.
Figure 13B:
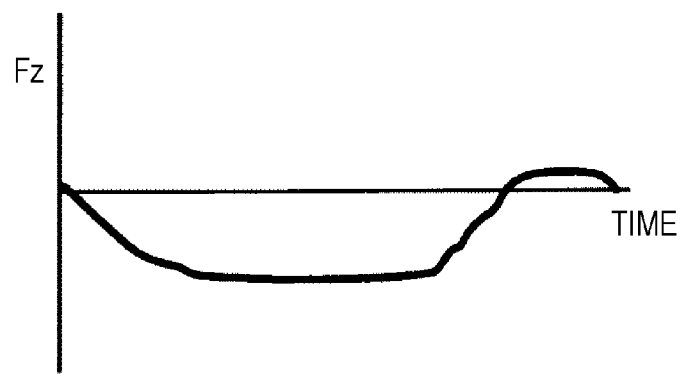
FIG. 13B illustrates the waveform information obtained by filtering out a fluctuation frequency component from the waveform information of the load data in the Fz direction illustrated in FIG. 13A.
Figure 14A:
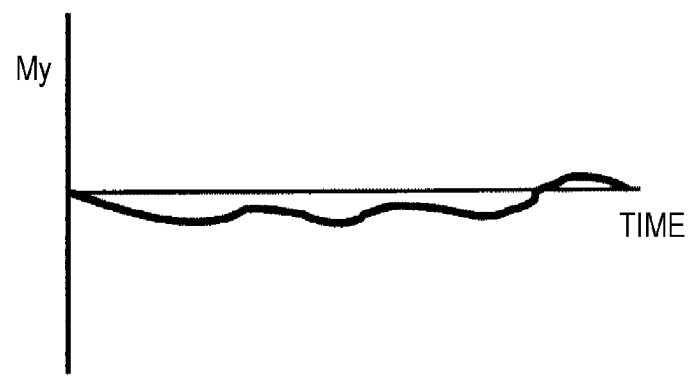
FIG. 14A illustrates an example of the waveform information of the load data in the My direction when the user moves forward in a straight line in manual mode.
Figure 14B:
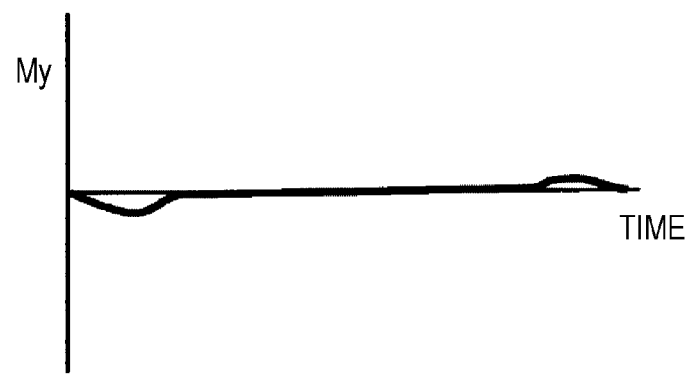
FIG. 14B illustrates waveform information obtained by filtering out a fluctuation frequency component from the waveform information of the load data in the My direction illustrated in FIG. 14A.

As an example, the process of determining the movement intention of a user with low physical ability is described below. FIG. 13A illustrates an example of the waveform information of the load data in the Fz direction when the user moves forward in a straight line in manual mode. FIG. 13B illustrates the waveform information obtained by filtering out a fluctuation frequency component from the waveform information of the load data in the Fz direction illustrated in FIG. 13A. FIG. 14A illustrates an example of the waveform information of the load data in the My direction when the user moves forward in a straight line in manual mode. FIG. 14B illustrates waveform information obtained by filtering out a fluctuation frequency component from the waveform information of the load data in the My direction illustrated in FIG. 14A. Note that the waveform information illustrated in FIGS. 13A and 14A is waveform information of the handlebar load acquired in step ST11. The waveform information illustrated in FIGS. 13B and 14B is the waveform information of the corrected handlebar load obtained by filtering out a fluctuation frequency component in step ST15.

As illustrated in FIG. 13A, since the walking of the user with low physical ability is not stable, fluctuation occurs in the waveform information of the load data in the Fz direction when the user moves forward in a straight line. That is, the value of the handlebar load in the Fz direction detected by the detection unit 13 varies when the user moves forward in a straight line. The load correction unit 19 filters out a fluctuation frequency component from the waveform information of the handlebar load in the Fz direction acquired by the detection unit 13. As a result, as illustrated in FIG. 13B, the fluctuation of the waveform information of the handlebar load in the Fz direction during the rectilinear operation can be removed. Thus, the user movement intention discovery unit 20 can easily determine that the movement intention of the user is a forward movement in a straight line on the basis of the corrected handlebar load.

In addition, as illustrated in FIG. 14A, fluctuation occurs in the waveform information of the load data in the My direction when the user with low physical ability moves forward in a straight line in manual mode. That is, the value of the handlebar load in the My direction detected by the detection unit 13 varies when the user moves forward in a straight line. The load correction unit 19 filters out a fluctuation frequency component from the waveform information of the handlebar load in the My direction acquired by the detection unit 13. In this manner, as illustrated in FIG. 14B, the fluctuation of the waveform information of the handlebar load in the My direction during a forward movement in a straight line in manual mode can be removed. As a result, the user movement intention discovery unit 20 can easily determine that the movement intention of the user is a forward movement in a straight line on the basis of the corrected handlebar load.

In addition, the user movement intention discovery unit 20 may determine the turning radius at the time of turning. For example, for the users with weak legs, the robot 1 may gently turn by setting a turning radius that is larger than usual. In contrast, for the users with strong legs, the turning radius may be made smaller than usual so that the vehicle turns rapidly. The turning radius may be determined from, for example, the value of the correction handlebar load.

Alternatively, the user movement intention discovery unit 20 may acquire, from the actuator control unit 22, the information about the amounts of rotation of the wheels 17 and determine the movement intention of the user on the basis of the information about the amounts of rotation and the information about the corrected handlebar load.

Guidance/Manual Mode Switching Determination Process

Figure 15:
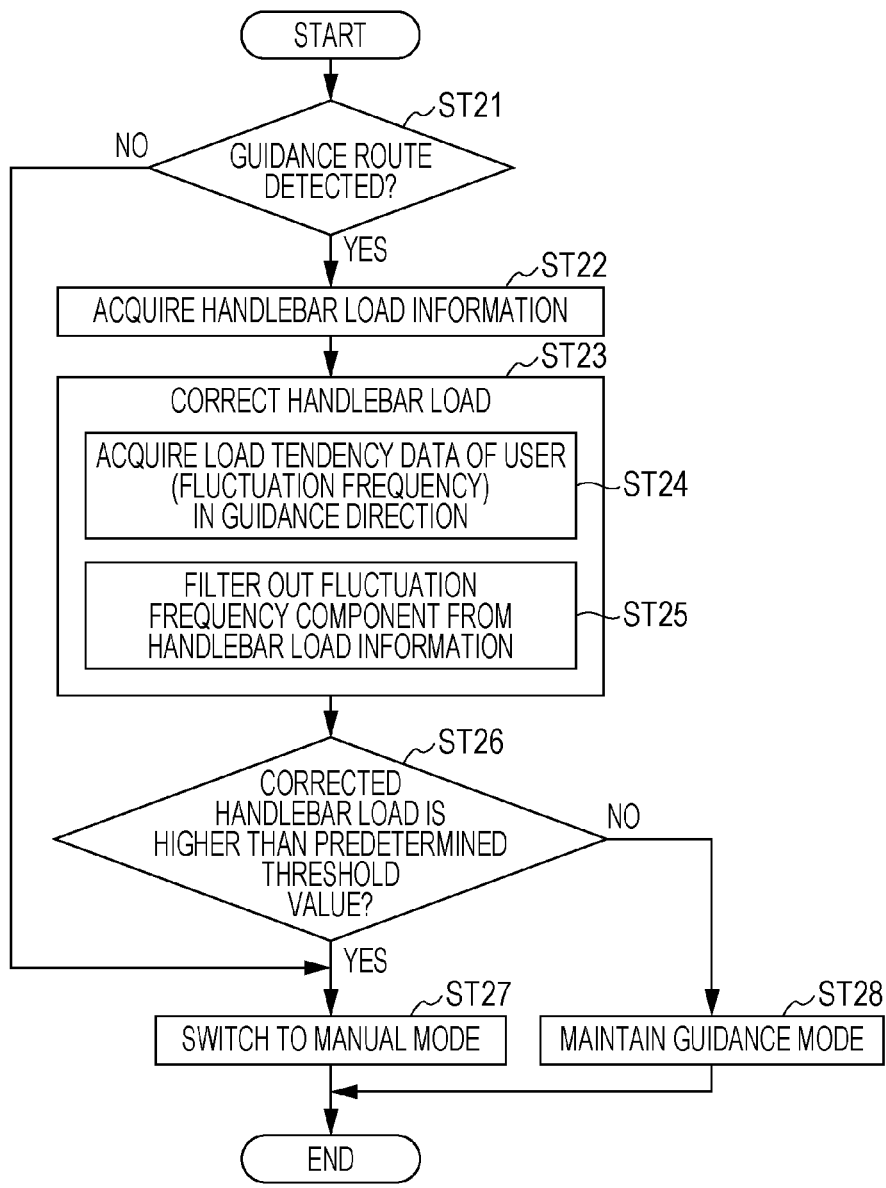
FIG. 15 is a flowchart of an exemplary guidance/manual mode switching determination process performed by the walking-support robot according to the first exemplary embodiment of the present disclosure.

The guidance/manual mode switching determination process performed by the robot 1 is described below with reference to FIG. 15. FIG. 15 is a flowchart of an exemplary guidance/manual mode switching determination process.

As illustrated in FIG. 15, in step ST21, the guidance/manual mode switching determination unit 26 determines whether a guidance route has been acquired from the guidance intention calculation unit 25. More specifically, the guidance/manual mode switching determination unit 26 determines whether the robot 1 is positioned on the guidance route. If the guidance/manual mode switching determination unit 26 has acquired the guidance route, the processing proceeds to step ST22. However, if the guidance/manual mode switching determination unit 26 has not acquired the guidance route, the processing proceeds to step ST27, where the mode is switched to the manual mode. That is, if the guidance/manual mode switching determination unit 26 has not acquired the guidance route, it is determined that the robot 1 is not guiding the user to the destination along the guidance route and, thus, the support mode is switched to the manual mode.

In step ST22, the detection unit 13 acquires the handlebar load information.

In step ST23, the load correction unit 19 corrects the value of the handlebar load acquired by the detection unit 13. Correction of the handlebar load is performed in steps ST24 and ST25.

In step ST24, the user load tendency extraction unit 30 acquires, from the load tendency map 31, the fluctuation frequency in the current guidance direction. The user load tendency extraction unit 30 transmits information about the fluctuation frequency to the load correction unit 19 as load tendency data. Note that the current guidance direction can be estimated by acquiring the information about the rotation amounts of the wheels 17 from the actuator control unit 22.

In step ST25, the load correction unit 19 filters out the fluctuation frequency component acquired in step ST24 from the handlebar load acquired in step ST22. In this manner, the load correction unit 19 corrects the value of the handlebar load detected by the detection unit 13. The information about the corrected handlebar load obtained by the load correction unit 19 is transmitted to the guidance/manual mode switching determination unit 26.

In addition, the load correction unit 19 may correct the value of the handlebar load on the basis of the location of use and the operating time of the robot 1 and the physical conditions of the user. In this case, the user load tendency extraction unit 30 extracts, from the load tendency map 31, data relating to the location of use and the operating time of the robot 1 and the physical conditions of the user and transmits the data to the load correction unit 19. For example, the load correction unit 19 may correct the handlebar load so that the handlebar load in the case where the robot 1 is used in the living room or when the user is in poor physical condition is smaller than that in the case where the robot 1 is used in a corridor or when the user is in good physical condition.

In step ST26, the guidance/manual mode switching determination unit 26 determines whether the value of the handlebar load corrected in step ST23 is greater than a predetermined threshold value. If the corrected value of the handlebar load is greater than the predetermined threshold value, the processing proceeds to step ST27, where the support mode is switched from guidance mode to manual mode. However, if the corrected value of the handlebar load is less than or equal to the predetermined threshold value, the processing proceeds to step ST28, where the guidance mode is maintained.

In addition, the predetermined threshold value used for determination of the support mode switching may be changed in accordance with the use situation, the operating time and the location of use of the robot 1. For example, when the user tends to frequently go to a bathroom while moving in a corridor in guidance mode, the user can easily switch the support mode to manual mode if the predetermined threshold value for the corridor is set to a small value. Alternatively, the predetermined threshold value may be set to a small value for users who frequently follow the guidance and may be set to a large value for users who less frequently follow the guidance.

Note that in step ST26, the support mode may be switched if the value of the correction handlebar load is greater than the predetermined threshold for a predetermined period of time. By using such a configuration, the support mode can be more appropriately switched. For example, when the user unintentionally and momentarily applies a load to the handlebar, the guidance mode can be maintained.

Calculation of Guidance Route and Guidance Intention of Robot

Figure 16:
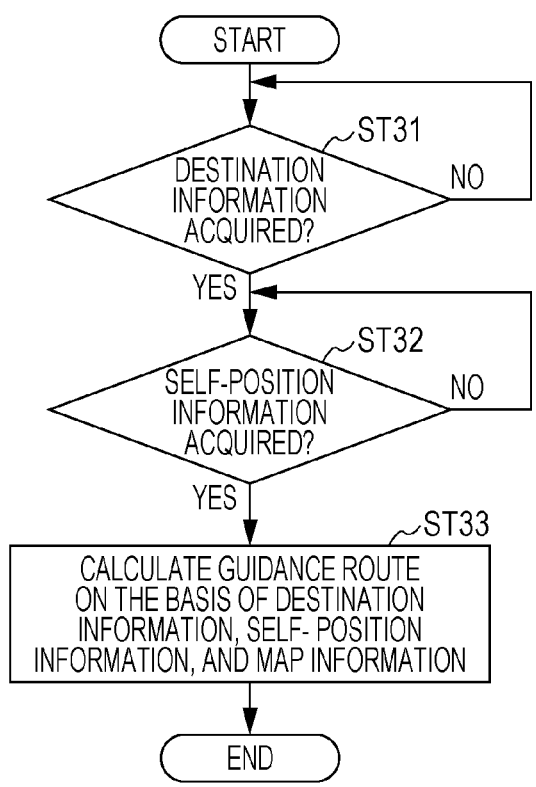
FIG. 16 is a flowchart of an exemplary guidance route calculation process performed by the walking-support robot according to the first exemplary embodiment of the present disclosure.

Calculation of the guidance route and the guidance intention of the robot 1 is described with reference to FIG. 16. FIG. 16 is a flowchart of an exemplary guidance route calculation process performed by the robot 1.

As illustrated in FIG. 16, in step ST31, the guidance intention calculation unit 25 determines whether the destination information of the user has been acquired from the interaction unit 28. More specifically, the guidance intention calculation unit 25 determines whether the user has input the destination information to the interaction unit 28. If the guidance intention calculation unit 25 has acquired the destination information, the processing proceeds to step ST32. However, if the guidance intention calculation unit 25 has not acquired the destination information, the process in step ST31 is repeated.

In step ST32, the guidance intention calculation unit 25 determines whether the self-position information of the robot 1 has been acquired from the self-position estimation unit 24. If the guidance intention calculation unit 25 has acquired the self-position information, the processing proceeds to step ST33. However, if the guidance intention calculation unit 25 has not acquired the self-position information, the process in step ST32 is repeated.

In step ST33, the guidance intention calculation unit 25 calculates a guidance route (a route from the departure place to the destination) on the basis of the destination information acquired in step ST31, the self-position information acquired in step ST32, and the map information stored in the storage unit 29 and calculates the guidance intention (the guidance direction and the guidance speed).

Calculation of Drive Force

Figure 17:
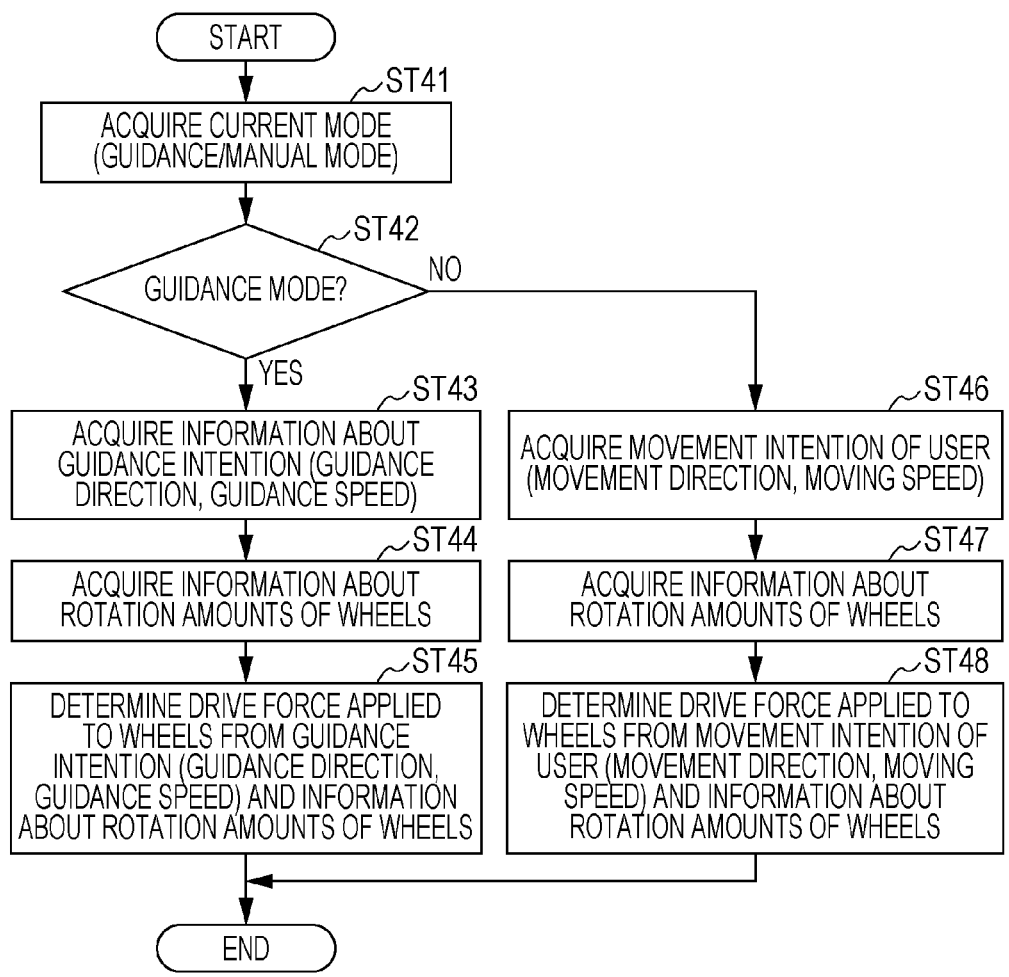
FIG. 17 is a flowchart of an exemplary drive force calculation process performed by the walking-support robot according to the first exemplary embodiment of the present disclosure.

Calculation of the drive force is described with reference to FIG. 17. FIG. 17 is a flowchart of an exemplary drive force calculation process.

As illustrated in FIG. 17, in step ST41, the drive force calculation unit 21 acquires the guidance/manual mode information from the guidance/manual mode switching determination unit 26.

In step ST42, the drive force calculation unit 21 determines whether the support mode of the robot 1 is guidance mode. If the support mode is guidance mode, the processing proceeds to step ST43. However, if the support mode is not guidance mode, that is, if the support mode is manual mode, the processing proceeds to step ST46.

In step ST43, the drive force calculation unit 21 acquires the information about the guidance intention from the guidance intention calculation unit 25.

In step ST44, the drive force calculation unit 21 acquires the information about the rotation amounts of the wheels 17 from the actuator control unit 22.

In step ST45, the drive force calculation unit 21 calculates the drive force on the basis of the information about the guidance intention acquired in step ST43 and the information about the rotation amounts of the wheels 17. More specifically, the drive force calculation unit 21 calculates the rotation amounts of the wheels 17 on the basis of the difference between the current movement direction calculated from the information about the rotation amounts of the wheels 17 and the guidance direction estimated from the information about the guidance intention and the difference between the moving speed calculated from the information about the rotation amounts of the wheels 17 and the guidance speed estimated from estimated from the information about the guidance intention.

In step ST46, the drive force calculation unit 21 acquires the information about the movement intention of the user from the user movement intention discovery unit 20.

In step ST47, the drive force calculation unit 21 acquires the information about the rotation amounts of the wheels 17 from the actuator control unit 22.

In step ST48, the drive force calculation unit 21 calculates the drive force on the basis of the information about the movement intention of the user and the information about the rotation amounts of the wheels 17 acquired in step ST46. More specifically, the drive force calculation unit 21 calculates the difference between the current movement direction calculated from the information about the rotation amounts of the wheels 17 and the movement direction estimated from the information about the movement intention of the user and the difference between the moving speed calculated from the information about the rotation amounts of the wheels 17 and the moving speed estimated from the information about the movement intention of the user.

As an example, the operation performed by the drive force calculation unit 21 in manual mode when the robot 1 is moving at a moving speed of 71 cm/s in the forward direction and the user increases the force Fy+ to increase the moving speed to 77 cm/s is described. The drive force calculation unit 21 acquires the information indicating that the rotational speed of each of the left and right wheels 17 is 2000 rpm when the drive force calculation unit 21 is moving at a speed of 71 cm/s in the forward direction. Subsequently, the drive force calculation unit 21 calculates the rotational speed, so that a rotational speed of 2,500 rpm is required for each of the left and right wheels 17 in order to set the moving speed of the robot 1 to 77 cm/s. The drive force calculation unit 21 calculates the drive force so as to increase the rotational speed of each of the left and right wheels 17 by 500 rpm.

While the first exemplary embodiment has been described with reference to the example in which the drive force calculation unit 21 calculates the drive force on the basis of the information about the movement intention of the user or the information about the guidance intention and the information about the amounts of rotation of the wheels 17 acquired from the actuator control unit 22, the calculation technique is not limited thereto. For example, the drive force calculation unit 21 may calculate the drive force from only the information about the movement intention of the user or the information about the guidance intention. That is, step ST44 and step ST47 need not be included in the drive force calculation process.

Alternatively, the drive force calculation unit 21 may calculate the drive force on the basis of a control table indicating the correspondence between the handlebar load and the rotation amounts of the wheels 17. More specifically, the drive force calculation unit 21 may include a storage unit that stores the control table indicating the correspondence between the handlebar load and the rotation amounts of the wheels 17. The drive force calculation unit 21 may calculate the rotation amounts of the wheels 17 corresponding to the value of the handlebar load detected by the detection unit 13 by using the control table stored in the storage unit. In addition, the control table may be updated by correcting the value of the handlebar load in the control table on the basis of the load tendency data extracted from the user load tendency extraction unit 30.

Effects

According to the walking-support robot 1 of the first exemplary embodiment, the following effects can be provided.

According to the walking-support robot 1 of the first exemplary embodiment, since the support mode can be switched by using the handlebar load value, more comfortable walking support can be provided to the users.

According to the robot 1, the value of the handlebar load can be corrected on the basis of the load tendency data of the user. Such a configuration allows the robot 1 to correct the value of the handlebar load in accordance with the load tendency of the user. Therefore, according to the robot 1, the support mode can be appropriately switched in accordance with the physical ability of the user.

For example, for a user who tends to sway left and right while walking, the value of the handlebar load is corrected by removing the fluctuation frequency caused by the right-and-left swaying motion from the handlebar load. In this manner, the value of the handlebar load can be corrected in accordance with the physical ability of the user. Thus, the support mode of the robot 1 can be switched in accordance with the physical ability of the user. As a result, more comfortable walking support can be provided to the user.

According to the first exemplary embodiment, the fluctuation frequency of the handlebar load is used as the load tendency data. By using the fluctuation frequency, the robot 1 can acquire the load tendency data of the user in a wide range from small fluctuation having small irregularities to large fluctuation having large irregularities appearing in the waveform information of the handlebar load. Thereafter, the robot 1 can correct the handlebar load. As a result, the robot 1 can support the user with walking in accordance with the physical ability of the user more appropriately.

Note that according to the first exemplary embodiment, each of the load tendency data generation unit 15, the load correction unit 19, the user movement intention discovery unit 20, the drive force calculation unit 21, the actuator control unit 22, the self-position estimation unit 24, the guidance intention calculation unit 25, and the guidance/manual mode switching determination unit 26 may include, for example, a memory (not illustrated) storing a program for causing the element to function and a processing circuit (not illustrated) corresponding to a processor, such as a central processing unit (CPU). By using the processor that executes the program, each of the elements may accomplish the function thereof. Alternatively, each of the load tendency data generation unit 15, the load correction unit 19, the user movement intention discovery unit 20, the drive force calculation unit 21, the actuator control unit 22, the self-position estimation unit 24, the guidance intention calculation unit 25, and the guidance/manual mode switching determination unit 26 may be configured by using an integrated circuit that causes the element to function.

While the first exemplary embodiment has mainly been described with reference to the operation performed by the walking-support robot 1, these operations can also be performed as a walking support method.

While the first exemplary embodiment has been described with reference to the example in which the fluctuation frequency is set in each of the movement direction/guidance directions and the moment directions, the processing is not limited thereto. For example, a common fluctuation frequency may be set in all of the directions. As a result, the handlebar load can be corrected in a simplified manner.

While the first exemplary embodiment has been described with reference to the example in which the forward movement, the backward movement, the right-turn movement, and the left-turn movement of the robot 1 are controlled by determining the rotation amounts of the two wheels 17, the control is not limited thereto. For example, the operation performed by the robot 1 may be controlled by controlling the rotation amounts of the wheels 17 by using a brake mechanism or the like.

While the first exemplary embodiment has been described with reference to the example in which the guidance/manual mode switching determination unit 26 determine switching of the support mode by comparing the corrected handlebar load with a predetermined threshold value, the determination technique is not limited thereto. For example, switching of the support mode may be determined by comparing the handlebar load acquired in step ST22 with a predetermined threshold value. That is, the robot 1 may determine switching of the support mode by comparing the acquired handlebar load with a predetermined threshold value without correcting the handlebar load acquired by the detection unit 13.

In addition, the guidance/manual mode switching determination unit 26 may switch the support mode if a load value of intention to walk that differs from the guidance intention of the robot is input. Furthermore, the guidance/manual mode switching determination unit 26 may switch the support mode if a load value of a intention to walk that differs from the guidance intention of the robot is input for a certain period of time or longer.

According to the first embodiment, in the case where the load tendency data corresponding to the movement operation of the robot 1 reaches a predetermined threshold value or higher, the load correction unit 19 may correct (perform filtering on) the handlebar load detected by the detection unit 13 on the basis of the load tendency data. For example, if, during forward movement in a straight line of the robot 1 (forward movement in the Fy+ direction), the load tendency data (the fluctuation frequency) in the Mz direction reaches a threshold value of 0 Hz or higher, the load data corresponding to the forward movement in a straight line of the robot 1 may be corrected on the basis of the load tendency data. By using such a configuration, the fluctuation frequency in the Mz direction, which is not needed while the robot 1 is moving forward in a straight line, can be removed by filtering. Note that the predetermined threshold value may be changed in accordance with, for example, the physical ability of the user. For example, the predetermined threshold value may be changed to 1 Hz on the basis of information indicating that a fluctuation frequency occurs at 1 Hz for healthy people. The load tendency data corresponding to the movement operation of the robot 1 may be load tendency data in the same direction as the movement direction of the robot 1 or load tendency data in a direction that differs from the movement direction of the robot 1. For example, if the load tendency data of another user is set as the predetermined threshold value, the load tendency data of the user may be compared with the load tendency data of another user in a movement direction that is the same as the movement direction corresponding to the movement operation performed by the robot 1.

While the first exemplary embodiment has been described with reference to the example in which the guidance/manual mode switching determination unit 26 determines to change the support mode from guidance mode to manual mode if the value of the handlebar load corrected by the load correction unit 19 is larger than the predetermined threshold value in guidance mode, the determination is not limited thereto. For example, the guidance/manual mode switching determination unit 26 may determine switching of the support mode on the basis of the movement intention of the user and the guidance intention of the robot. Another example of the guidance/manual mode switching determination process according to the first exemplary embodiment is described below.

Another Example of Guidance/Manual Mode Switching Determination Process

Figure 18:
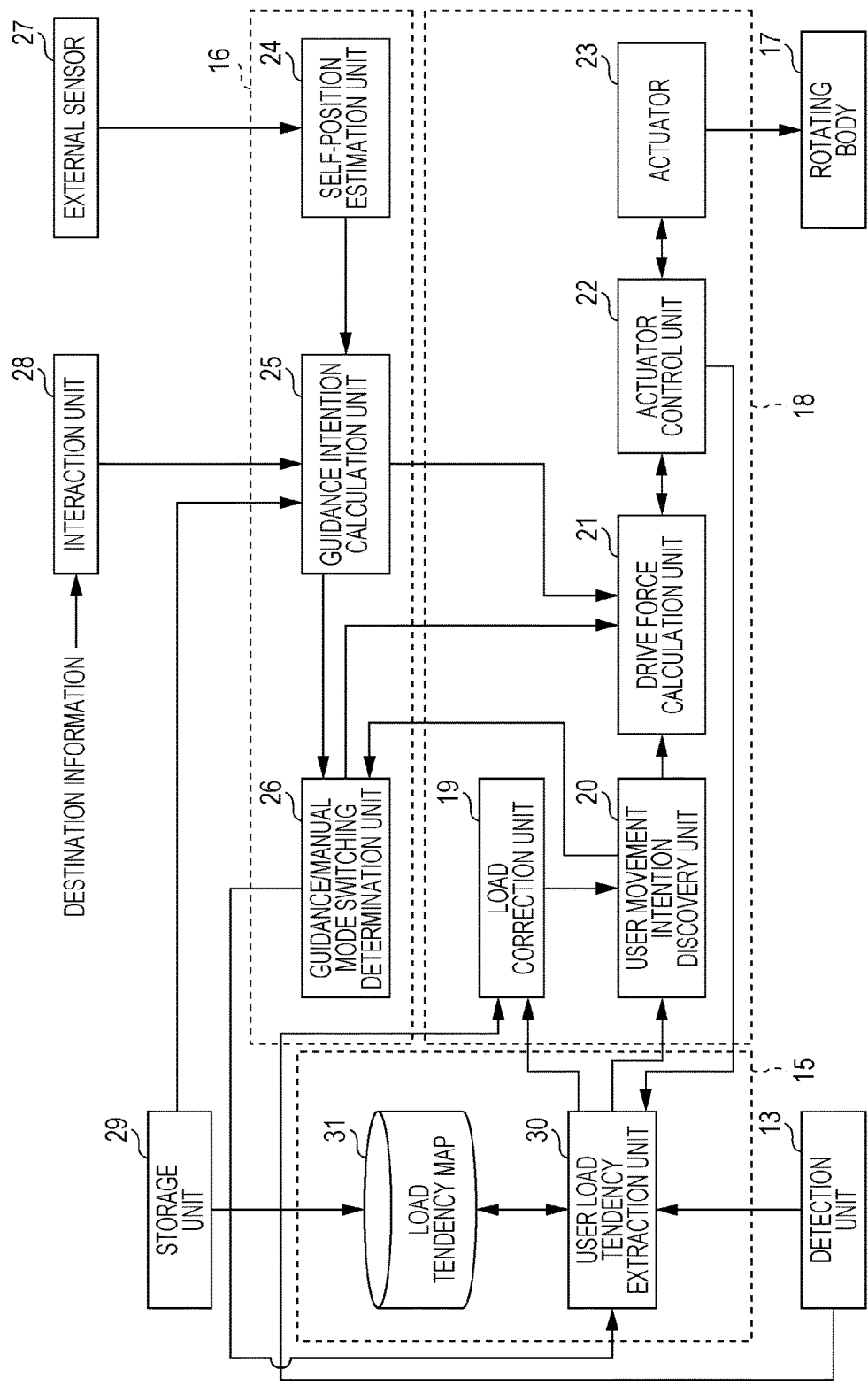
FIG. 18 is a control block diagram illustrating another control configuration for walking assistance provided by the walking-support robot according to the first exemplary embodiment of the present disclosure.

FIG. 18 is a control block diagram illustrating another control configuration for walking assistance provided by the walking-support robot. As illustrated in FIG. 18, the guidance/manual mode switching determination unit 26 may determine whether the support mode is to be switched on the basis of the movement intention of the user (the movement speed and the movement direction) estimated by the user movement intention discovery unit 20 and the guidance intention (the guidance speed and the guidance direction) calculated by the guidance intention calculation unit 25. More specifically, the guidance/manual mode switching determination unit 26 may determine whether the support mode is to be switched on the basis of whether or not the difference between the movement intention of the user and the guidance intention exceeds a predetermined threshold value.

Figure 19:
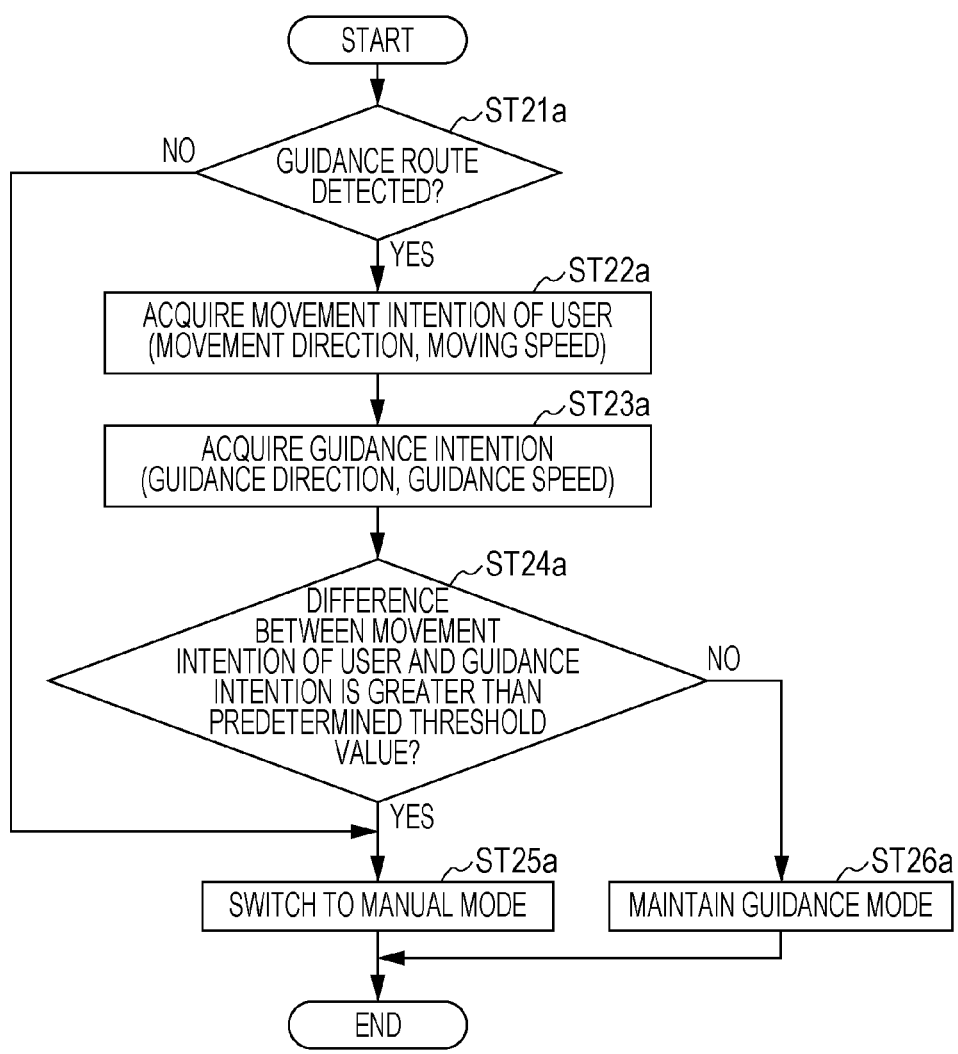
FIG. 19 is a flowchart of another exemplary guidance/manual mode switching determination process performed by the walking-support robot according to the first exemplary embodiment of the present disclosure.

FIG. 19 is a flowchart of another exemplary guidance/manual mode switching determination process. As illustrated in FIG. 19, in step ST21a, the guidance/manual mode switching determination unit 26 determines whether a guidance route has been acquired from the guidance intention calculation unit 25. More specifically, the guidance/manual mode switching determination unit 26 determines whether the robot 1 is positioned on the guidance route. If the guidance/manual mode switching determination unit 26 has acquired the guidance route, the processing proceeds to step ST22a. However, if the guidance/manual mode switching determination unit 26 has not acquired the guidance route, the processing proceeds to step ST25a, where the support mode is switched to manual mode. That is, if the guidance/manual mode switching determination unit 26 has not acquired the guidance route, the guidance/manual mode switching determination unit 26 determines that the robot 1 is not guiding the user to the destination along the guidance route and, thus, switches the mode to manual mode.

In step ST22a, the guidance/manual mode switching determination unit 26 acquires the movement intention of the user (the movement speed and the movement direction) from the user movement intention discovery unit 20.

In step ST23a, the guidance/manual mode switching determination unit 26 acquires the guidance intention (the guidance speed and the guidance direction) from the guidance intention calculation unit 25.

In step ST24a, the guidance/manual mode switching determination unit 26 determines whether the difference between the user movement intention acquired in step ST22a and the guidance intention acquired in step ST23a is larger than a predetermined threshold value. If the difference is larger than the predetermined threshold value, the processing proceeds to step ST25a, where the support mode is switched from guidance mode to manual mode. However, if the difference is less than or equal to the predetermined threshold value, the processing proceeds to step ST26a, where the guidance mode is maintained.

The difference between the movement intention of the user and the guidance intention includes, for example, a difference between the moving speed of the user and the guidance speed of the robot and a difference between the movement direction of the user and the guidance direction of the robot. However, the difference is not limited thereto. Any parameter that indicates whether the movement intention of the user is the same as the guidance intention of the robot can be used as the difference.

According to the first exemplary embodiment, when the correction is made by using the load tendency data for each of the movement operations and for each of the guidance mode and the manual mode, the load value in guidance mode may be corrected by using the load tendency data in manual mode. The load value in guidance mode may be corrected by using the load tendency data in guidance mode. The load value in manual mode may be corrected by using the load tendency data in manual mode. The load value in manual mode may be corrected by using the load tendency data in guidance mode. Alternatively, on the assumption that the difference in the load tendency data between the manual mode and the guidance mode in the same movement operation is substantially the same as the difference in the load between the manual mode and the guidance mode in another movement operation, the load value may be corrected by using the difference in the load tendency data between the manual mode and the guidance mode in the same movement operation.

While the first exemplary embodiment has been described with reference to the example in which the support mode is switched from guidance mode to manual mode on the basis of the handlebar load, the switching technique is not limited thereto. For example, the support mode may be switched from manual mode to guidance mode on the basis of the handlebar load. For example, if the state in which the handlebar load is lower than or equal to a predetermined threshold value continues for a predetermined period of time, the manual mode may be switched to guidance mode. By using such a configuration, even when, for example, the guidance mode is switched to manual mode in order to avoid an obstacle, the user can easily switch the support mode from manual mode to guidance mode. Accordingly, the user can walk more comfortably. Even in such a configuration, the value of the handlebar load can be corrected by using the user load tendency data described above. In addition, a voice or display message indicating that the support mode needs to be switched back to guidance mode may be output in manual mode and, thereafter, the user can manually select the guidance mode to go back to guidance mode.

Second Exemplary Embodiment

A walking-support robot according to a second exemplary embodiment of the present disclosure is described below. In the second exemplary embodiment, the differences from the first exemplary embodiment are mainly described. In the second exemplary embodiment, the same reference numerals are used to indicate configurations which are the same as or similar to those of the first exemplary embodiment. In addition, in the second exemplary embodiment, description that is the same as in the first exemplary embodiment is not repeated.

Unlike the first exemplary embodiment, according to second exemplary embodiment, the average load value is used as the load tendency data. The walking-support robot according to the second exemplary embodiment includes the same constituent elements as the walking-support robot 1 according to the first exemplary embodiment, and the walking-support robot according to the second exemplary embodiment is identified by the reference numeral "51" in FIGS. 1, 2 and 4.

FIG. 20 illustrates a load tendency map 31 according to the second exemplary embodiment. As illustrated in FIG. 20, the load tendency map 31 stores, as the load tendency data, the average load value in the movement direction/guidance direction during walking and the average load value in the direction in which the center of gravity deviates during walking for each of the two types of support modes.

Generation of Load Tendency Data

Figure 21:
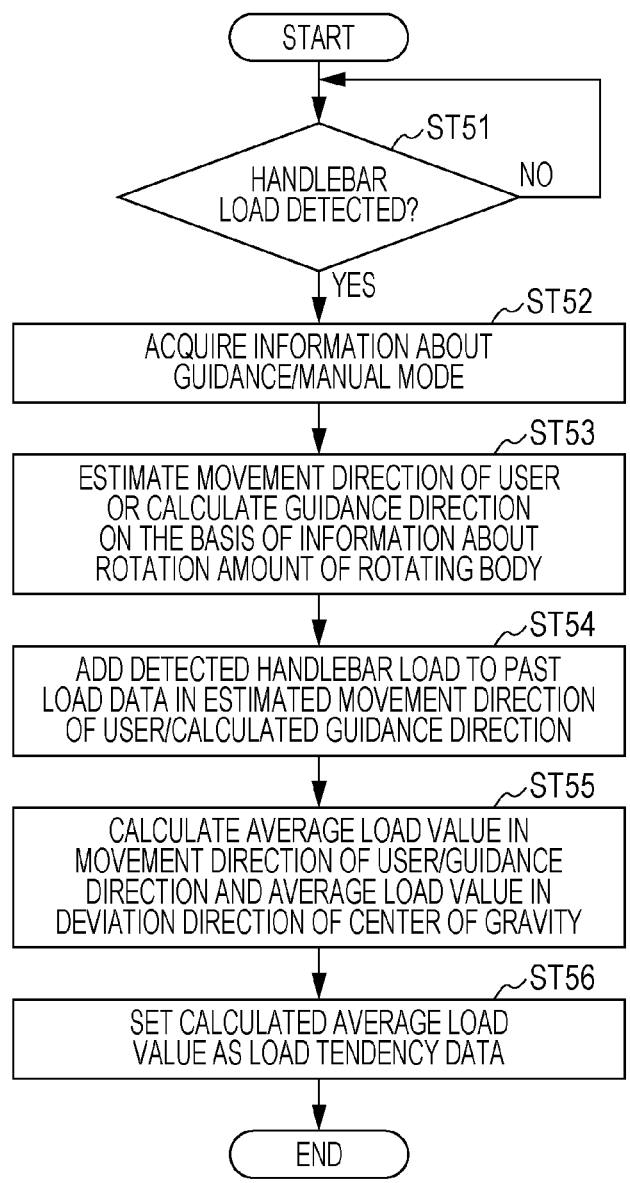
FIG. 21 is a flowchart of an exemplary load tendency data generation process performed by a walking-support robot according to the second exemplary embodiment of the present disclosure.

Generation of load tendency data is described with reference to FIG. 21. FIG. 21 is a flowchart of an exemplary load tendency data generation process performed by a walking-support robot 51 (hereinafter simply referred to as a "robot 51").

As illustrated in FIG. 21, in step ST51, it is determined whether the handlebar load is detected by the detection unit 13. In step ST51, it is determined whether the user holds the handlebar portion 12. If the detection unit 13 detects the handlebar load, the processing proceeds to step ST52. However, if the detection unit 13 does not detect the handlebar load, the process in step ST51 is repeated.

In step ST52, the user load tendency extraction unit 30 acquires the information about the current support mode from the guidance/manual mode switching determination unit 26. More specifically, the user load tendency extraction unit 30 determines whether the current support mode of the robot 51 is guidance mode or manual mode.

In step ST53, the user load tendency extraction unit 30 estimates the movement direction of the user or calculates the guidance direction on the basis of the information about the current support mode and the information about the rotation amounts of the wheels 17. More specifically, if, in step ST51, a change in the handlebar load is detected, the actuator control unit 22 acquires the information about the rotation amounts of the wheels 17. The information about the rotation amounts acquired by the actuator control unit 22 is transmitted to the user load tendency extraction unit 30.

For example, the user load tendency extraction unit 30 estimates the movement direction of the user or calculates the guidance direction on the basis of the rotation amounts of the two wheels 17 disposed on the left and right.

In step ST54, the user load tendency extraction unit 30 adds the handlebar load detected in step ST51 to the past load data in the estimated movement direction/guidance direction of the user. More specifically, the user load tendency extraction unit 30 reads the past load data stored in the load tendency map 31 and adds the handlebar load detected in step ST51 to the read past load data. As used herein, the term "past load data" refers to all of the load data detected so far.

In step ST55, the user load tendency extraction unit 30 calculates the average load value in the movement direction/guidance direction and the average load value in the deviation direction while the user is walking.

In step ST56, the user load tendency extraction unit 30 sets, as the load tendency data, the calculated average load value in the movement direction of the user during walking or the average load value in the guidance direction and the average load value in the deviation direction. More specifically, the user load tendency extraction unit 30 transmits the information about the calculated average load values to the load tendency map 31 to update the average load values in the load tendency map 31, namely, the average load value of the user in the movement direction/guidance direction and the average load value in the deviation direction while the user is walking.

Guidance/Manual Mode Switching Determination Process

Figure 22:
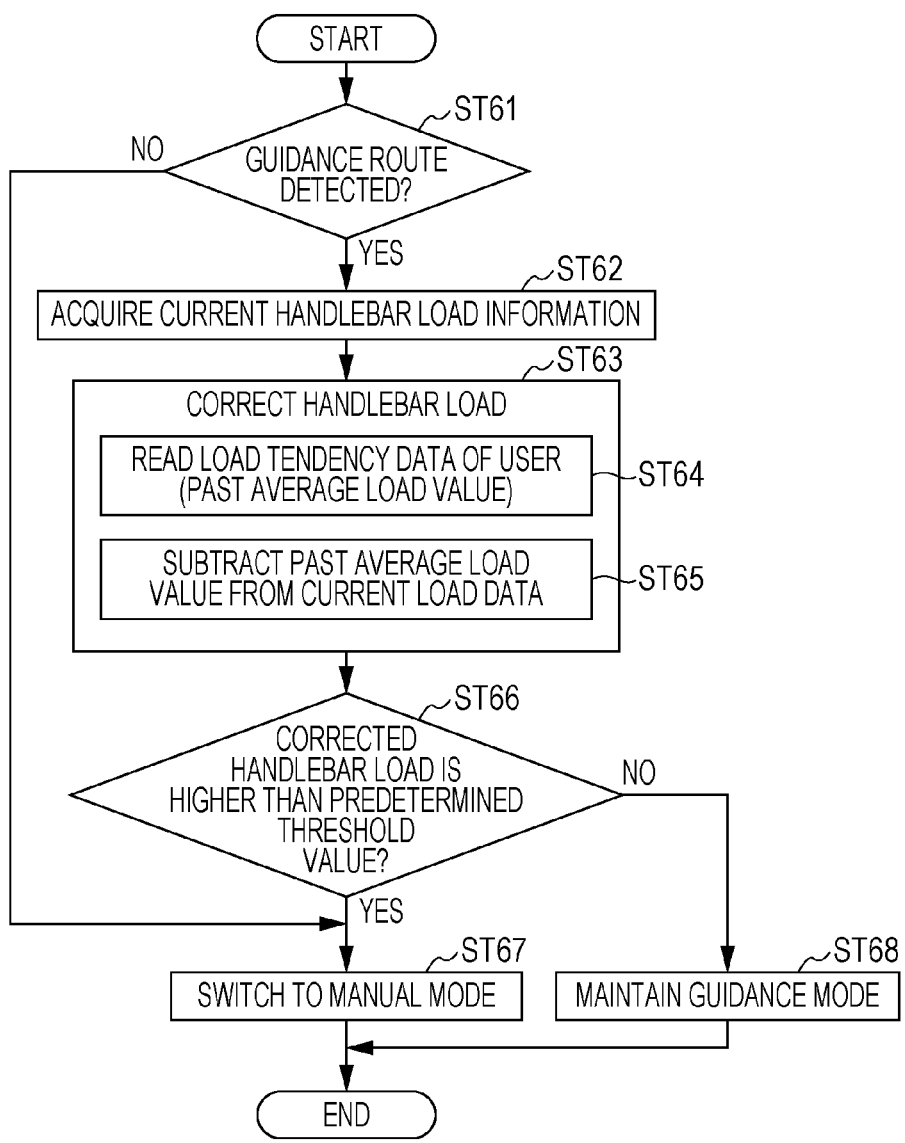
FIG. 22 is a flowchart of an exemplary guidance/manual mode switching determination process performed by the walking-support robot according to the second exemplary embodiment of the present disclosure.

The guidance/manual mode switching determination process is described below with reference to FIG. 22. FIG. 22 is a flowchart of an exemplary guidance/manual mode switching determination process.

As illustrated in FIG. 22, in step ST61, the guidance/manual mode switching determination unit 26 determines whether a guidance route has been acquired from the guidance intention calculation unit 25. More specifically, the guidance/manual mode switching determination unit 26 determines whether the robot 51 is positioned on the guidance route. If the guidance/manual mode switching determination unit 26 has acquires the guidance route, the processing proceeds to step ST62. However, if the guidance/manual mode switching determination unit 26 has not acquired the guidance route, the processing proceeds to step ST67, where the support mode is switched to manual mode. That is, if the guidance/manual mode switching determination unit 26 has not acquired the guidance route, it is determined that the robot 1 is not guiding the user to the destination along the guidance route and, thus, the mode is switched to manual mode.

In step ST62, the detection unit 13 acquires the handlebar load information.

In step ST63, the load correction unit 19 corrects the value of the handlebar load acquired by the detection unit 13. To correct the handlebar load, the processes in steps ST64 and ST65 are performed.

In step ST64, the user load tendency extraction unit 30 reads the load tendency data of the user. More specifically, the user load tendency extraction unit 30 reads the past average load value from the load tendency map 31 and transmits the past average load value to the load correction unit 19.

In step ST65, the load correction unit 19 subtracts the past average load value from the current load data. In this manner, the load correction unit 19 corrects the value of the handlebar load.

In step ST66, the guidance/manual mode switching determination unit 26 determines whether the value of the handlebar load corrected in step ST63 is greater than a predetermined threshold value. If the corrected value of the handlebar load is greater than a predetermined threshold value, the processing proceeds to step ST67, where the support mode is switched from guidance mode to manual mode. However, if the corrected value of the handlebar load is less than or equal to the predetermined threshold value, the processing proceeds to step ST68, where the guidance mode is maintained.

As an example, correction of the handlebar load according to the second exemplary embodiment is described in detail below. In this example, description is given with reference to the handlebar load applied by the user who is walking with the center of gravity deviated toward the right.

Correction of Handlebar load Using Average Load Value

Figure 23A:
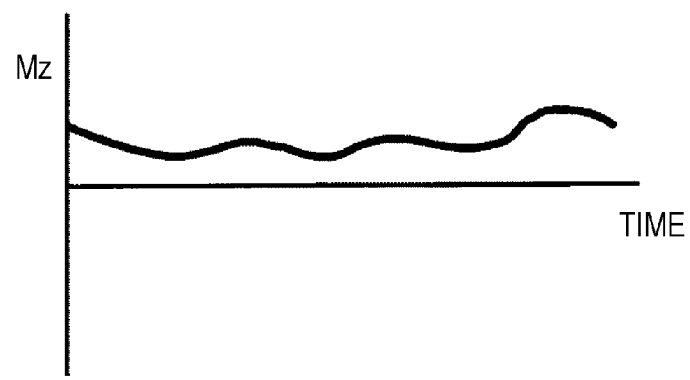
FIG. 23A illustrates an example of the waveform information of the current load data in the Mz direction when the user moves forward in a straight line.

FIG. 23A illustrates an example of the waveform information of the current load data in the Mz direction when the user moves forward in a straight line. As illustrated in FIG. 23A, since the center of gravity of the user is deviated toward the right, the load (the moment) in the Mz direction is detected by the detection unit 13 even during a forward movement in a straight line.

Figure 23B:
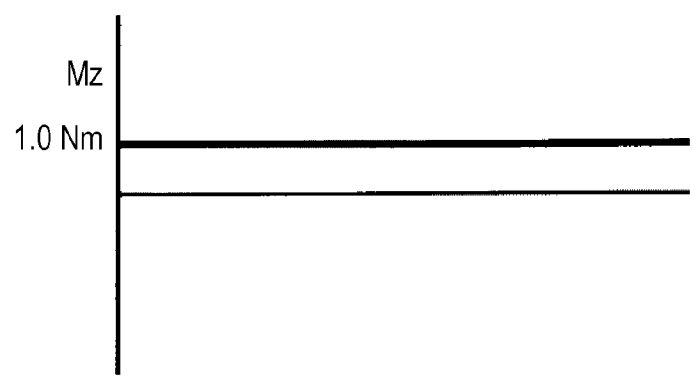
FIG. 23B illustrates the average load value of past load data in the Mz direction.

FIG. 23B illustrates the average load value of the past load data in the Mz direction. The user load tendency extraction unit 30 calculates the average load value of the past load data as illustrated in FIG. 23B by averaging the waveform information of the past load data. In the case illustrated in FIG. 23B, the average load value in the past is 1.0 Nm in the Mz direction. According to the second exemplary embodiment, the average load value illustrated in FIG. 23B is used as the load tendency data.

Figure 23C:
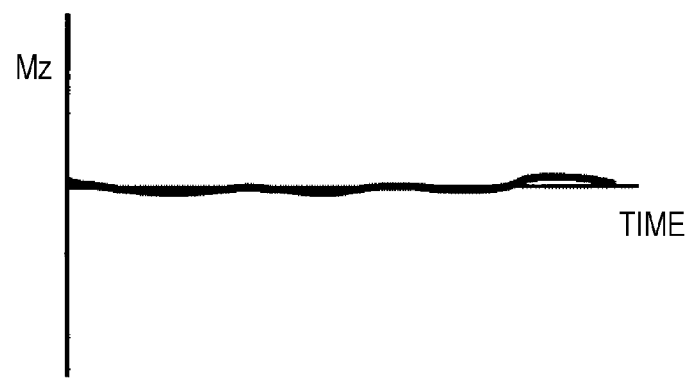
FIG. 23C illustrates the waveform information of the corrected load data according to the second exemplary embodiment of the present disclosure.

Subsequently, the load correction unit 19 corrects the current load data on the basis of the load tendency data. More specifically, the load correction unit 19 subtracts the past average load value 1.0 Nm illustrated in FIG. 23B from the waveform information of the current load data illustrated in FIG. 23A in the Mz direction. FIG. 23C illustrates the waveform information of the current load data in the Mz direction corrected by using the load tendency data. As illustrated in FIG. 23C, by subtracting the past average load value from the current load data, the total load applied in the Mz direction is reduced. In this manner, the load correction unit 19 can correct steady deviation of the load in the rightward direction.

The guidance/manual mode switching determination unit 26 determines the guidance/manual mode switching on the basis of the corrected information about the handlebar load.

While the above example of correction has been described with reference to a user who is walking with the center of gravity deviated to the right, the correction is not limited thereto. For example, the direction of the load applied by an elderly user in a bent-over posture may be deviated downward. In this case, the value of the handlebar load may be corrected by using the average load value in the Fz direction.

In addition, when the forward movement of the robot 51 is performed on the basis of the values of the handlebar load in the Fy direction and the Fz direction, the average load values in the Fy direction and the Fz direction may be used as the load tendency data. That is, during the forward movement of the robot 51, the value of the handlebar load may be corrected by using the average load values in the Fy direction and the Fz direction, Furthermore, when a turn movement of the robot 51 is performed on the basis of the load (the moment) in the Mz direction, the average load value in the Mz direction may be used as the load tendency data. That is, during a turn movement of the robot 51, the value of the handlebar load may be corrected by using the average load value in the Mz direction. Still furthermore, the average load values in all of the Fx, Fy, Fz, Mx, My, and Mz directions may be calculated, and the values of the handlebar load may be corrected by using the average load values in all of the directions. As described above, by correcting the handlebar loads by using the average load values in a plurality of directions, the load tendency of the user can be more accurately obtained. Accordingly, the robot 51 can more suitably operate in accordance with the physical ability of the user. Note that in correction of the handlebar load, at least one of the average load values in the Fx, Fy, Fz, Mx, My, and Mz directions can be calculated in accordance with the movement control of the robot 51, and the handlebar load can be corrected by using the calculated average load.

Note that in the user movement intention discovery unit 20 according to the second exemplary embodiment, the movement intention of the user is determined by performing the above-described correction of the handlebar load.

Effects

According to the walking-support robot 51 of the second exemplary embodiment, the following effects can be provided.

According to the walking-support robot 51 of the second exemplary embodiment, the average load value of the handlebar load is used as the load tendency data of the user. By using such a configuration, the load steadily applied by each of the users can be acquired as the load tendency data, and the load value can be corrected by using the acquired load tendency data, so that walking assistance that is more suitable for the physical ability of the user can be provided to the user. In addition, by using the average load value of the handlebar load as the load tendency data of the user, an error in extraction of the load tendency of the user can be reduced.

While the second exemplary embodiment has been described with reference to an example in which all of the handlebar loads detected in the past are used as the past load data when the load tendency data is calculated, the past load data is not limited thereto. The past load data used for calculating the load tendency data may be, for example, load data detected within a predetermined period of time. For example, the past load data used for calculating the load tendency data may be past load data detected within a predetermined period (for example, one year). In this way, by using only relatively recently detected load data, the current load tendency of the user can be easily extracted.

According to the second exemplary embodiment, the load tendency map 31 may store the load tendency data during stable walking. The user load tendency extraction unit 30 may acquire the load tendency data from the load tendency map 31 and transmit the load tendency data during stable walking to the load correction unit 19. The load correction unit 19 may compare the load tendency data during stable walking and the current load data of the user and correct the value of the handlebar load if the data differ from each other. For example, assume that the past load tendency indicates that the handlebar load in the Fz direction of the user when walking stably forward in a straight line is 10 N. If the user walks with their head forward and the handlebar load in the Fz direction reaches 20 N, the load correction unit 19 may correct the handlebar load in the Fz direction to the value of the handlebar load in the Fz direction while the user is walking stably. That is, the load correction unit 19 may correct a load of 20 N in the Fz direction to ½.

While the second exemplary embodiment has been described with reference to the example in which the load correction unit 19 corrects the current load data by subtracting the past average load value from the current load data, the correction is not limited thereto. For example, the load correction unit 19 may take into account other parameters so that the handlebar load can be corrected in accordance with the location of use and the operating time of the robot 51 and the physical conditions of the user.

In addition, if the robot 51 performs the movement control by using the sum of the Fz value and the Fy value, the ratio of the Fz value to the Fy value in adding the Fz to the Fy value may be changed. For example, control using the ratio Fz:Fy=6:4 may be changed to control using the ratio Fz:Fy=8:2. Alternatively, instead of correcting the load data by using only the load tendency data of the user, the load tendency data of the user may be compared with the average load tendency data of a plurality of users and, thereafter, the ratio used in correction may be changed so that the difference is reduced. When calculating the average of a plurality of users, the average may be calculated for each of groups classified by any combinations of, for example, the age, sex, location, and walking ability (the walking speed, walking rate, stride length, standing posture, left-and-right swaying).

In addition, the load correction unit 19 may correct the handlebar load by multiplying the current load data by a correction coefficient calculated from the past load tendency data. An example of correction of the handlebar load by using a correction coefficient is described below.

Correction of Handlebar Load Using Correction Coefficient

Figure 24A:
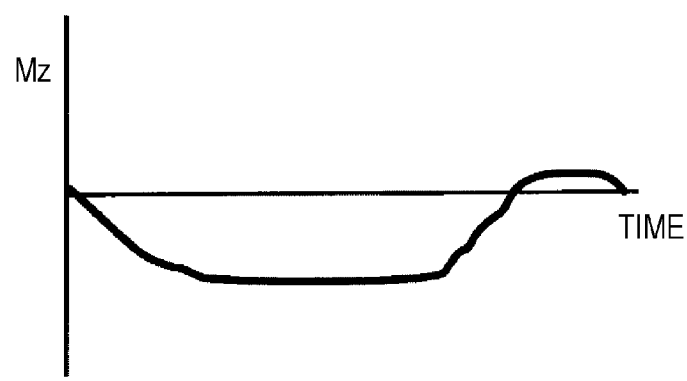
FIG. 24A illustrates an example of the waveform information of the past load data in the Mz direction when the user moves forward in a straight line.
Figure 24B:
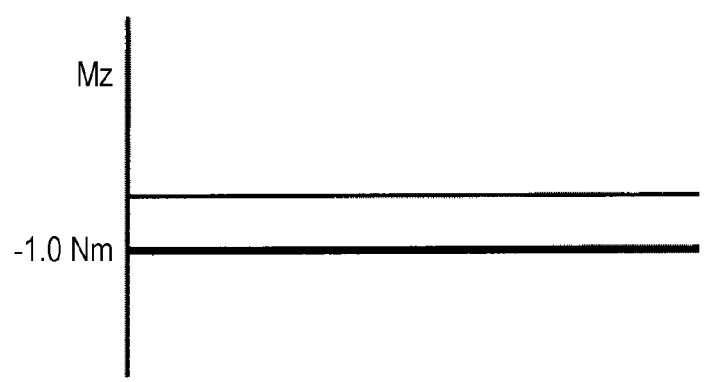
FIG. 24B illustrates the average load value of the past load data in the Mz direction illustrated in FIG. 24A.

FIG. 24A illustrates an example of the waveform information of load data in the Mz direction in the past when the user moves forward in a straight line. FIG. 24B illustrates the average load value of the past load data in the Mz direction illustrated in FIG. 24A. The user load tendency extraction unit 30 performs average calculation processing on the waveform information of the past load data illustrated in FIG. 24A. As a result, an average load value of the past load data illustrated in FIG. 24B is calculated as the load tendency data. In the case illustrated in FIG. 24B, the past average load value is −1.0 Nm in the Mz direction.

Figure 25A:
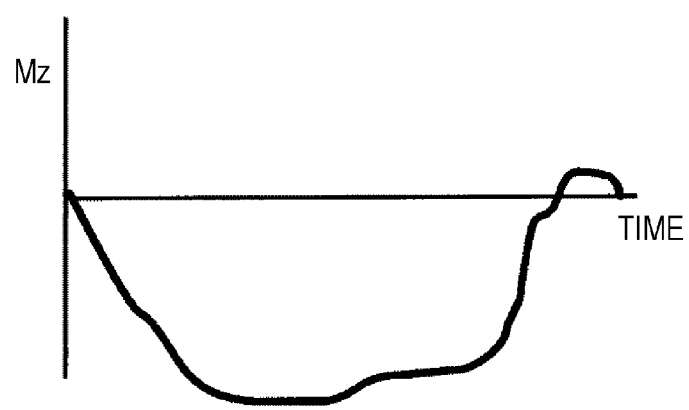
FIG. 25A illustrates an example of the waveform information of the current load data in the Mz direction when the user moves forward in a straight line.
Figure 25B:
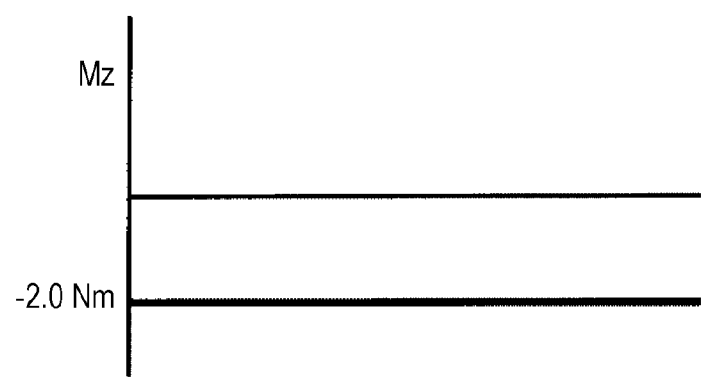
FIG. 25B illustrates the average load value of the current load data in the Mz direction illustrated in FIG. 25A.

Subsequently, an average load value is calculated from the current load data. FIG. 25A illustrates an example of the waveform information of the current load data in the Mz direction when the user moves forward in a straight line. FIG. 25B illustrates the average load value of the current load data in the Mz direction illustrated in FIG. 25A.

The load correction unit 19 performs average calculation processing on the waveform information of the current load data illustrated in FIG. 25A. As a result, the average load value of the current load data illustrated in FIG. 25B is calculated. In the case illustrated in FIG. 25B, the current average load value is −2.0 Nm in the Mz direction.

The load correction unit 19 calculates a correction coefficient by dividing the past average load value by the current average load value. In this case, the correction coefficient is 0.5 (=−1.0 Nm/−2.0 Nm). The load correction unit 19 corrects the handlebar load by multiplying the waveform information of the current load data by the correction coefficient. That is, by multiplying the waveform information of the current load data illustrated in FIG. 25A by the correction coefficient 0.5, the value of the handlebar load in the Mz direction detected by the detection unit 13 is corrected.

Figure 26:
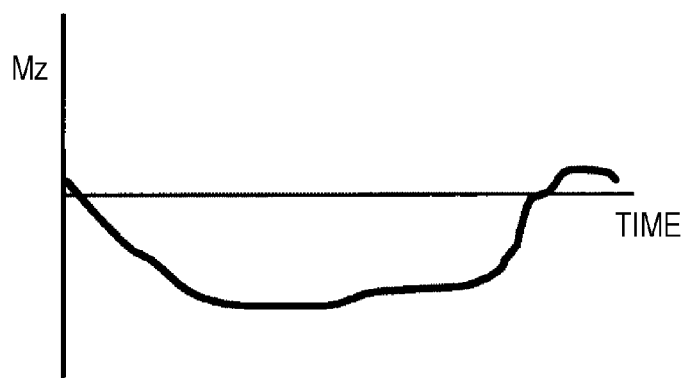
FIG. 26 illustrates an example of the waveform information of the corrected load data according to the second exemplary embodiment of the present disclosure.

FIG. 26 illustrates an example of the waveform information of the corrected load data. As illustrated in FIG. 26, the handlebar load detected by the detection unit 13 (refer to the waveform information in FIG. 25A) is corrected by multiplication with the correction coefficient. In this manner, the load correction unit 19 may correct the current handlebar load by multiplying the current load data by the correction coefficient calculated on the basis of the past load tendency data.

While the present disclosure has been described with reference to the exemplary embodiments with a certain level of detail, it should be noted that the more details of the configuration of the exemplary embodiments can be modified. In addition, changes in combinations and the order of the constituent elements of each of the exemplary embodiments can be made without departing from the scope and spirit of the present disclosure.

The correction of the handlebar load on the basis of the load tendency data described in the first and second exemplary embodiments is merely an example, and the present disclosure should not be limited thereto. To correct the handlebar load on the basis of the load tendency data, a variety of well-known correction methods may be employed. Examples of a correction method which can be employed include a method for smoothing fluctuation in the direction of the center of gravity with a moving average in accordance with the degree of fluctuation, a method for eliminating fluctuation by smoothing with a median filter, and a method for performing frequency analysis and removing or reducing a predetermined frequency component.

The present disclosure is applicable to a walking-support robot and a walking support method that support a user with walking more comfortably.

What is claimed is:

1. A robot comprising:
  a main body;
  a handlebar disposed on the main body, the handlebar being grippable by a user;
  a detector that detects a load applied to the handlebar;
  a moving device including a rotating body, the moving device moving the robot by controlling rotation of the rotating body; and
  a switcher that switches a support mode for supporting the user with walking,
    wherein the support mode includes a first mode in which the robot autonomously moves to guide the user who is walking and a second mode in which the robot moves in accordance with a first load detected by the detector, and
    wherein when the robot moves in the first mode, the switcher switches the support mode from the first mode to the second mode on the basis of a second load detected by the detector.

2. The robot according to claim 1, further comprising:
  a generator that generates tendency data indicating a tendency of the load applied to the handlebar on the basis of past load data applied to the handlebar and obtained during movement of the robot; and
  a corrector that corrects a value of the second load on the basis of the tendency data,
    wherein the switcher switches the support mode from the first mode to the second mode on the basis of the corrected value of the second load.

3. The robot according to claim 2, wherein the switcher switches the support mode from the first mode to the second mode if the corrected value of the second load is greater than a predetermined threshold value.

4. The robot according to claim 2, wherein the generator generates the tendency data for each of movement operations performed by the robot, and
  wherein the corrector corrects the value of the second load on the basis of the tendency data corresponding to the movement operation performed by the robot when the second load is detected.

5. The robot according to claim 4, wherein the movement operations include forward movement in a straight line, a backward movement in a straight line, right-turn movement, and left-turn movement.

6. The robot according to claim 4, wherein the corrector corrects the value of the second load on the basis of the tendency data if the tendency data corresponding to the movement operation performed by the robot reaches a predetermined threshold value or greater.

7. The robot according to claim 2, wherein the generator generates the tendency data for each of the two types of support modes of the robot, and
  wherein the corrector corrects the value of the second load on the basis of the tendency data corresponding to the support mode of the robot when the second load is detected.

8. The robot according to claim 2, wherein the tendency data is a fluctuation frequency calculated by using the past load data, and
  wherein the corrector corrects the value of the second load by filtering out a component of the fluctuation frequency from the second load.

9. The robot according to claim 2, wherein the load tendency data is an average load value calculated by using the past load data, and
  wherein the corrector corrects the value of the load on the basis of the average load value.

10. The robot according to claim 9, wherein the corrector corrects the value of the load by subtracting the average load value from the load detected by the detector.

11. robot according to claim 3, wherein the switcher changes the predetermined threshold value in accordance with usage conditions of the robot.

12. The robot according to claim 11, wherein the usage conditions include one of a location of use and an operating time of the robot.

13. The robot according to claim 2, further comprising:
  a storage that stores route information indicating guidance routes used by the robot to guide the user in the first mode,
    wherein the generator generates the tendency data for each of the guidance routes indicated by the route information stored in the storage, and
    wherein the corrector corrects the value of the second load on the basis of the tendency data corresponding to the guidance route on which the robot moves when the second load is detected.

14. The robot according to claim 1, further comprising:
  an intention calculator that calculates a guidance intention of the robot in the first mode; and an intention discoverer that determines a movement intention of the user on the basis of the value of the second load, wherein the switcher switches the support mode on the basis of a difference between the calculated guidance intention and the determined movement intention of the user.

15. The robot according to claim 2, wherein the detector detects a load applied in each of a plurality of axial directions, and the tendency data indicates the tendency of the load in each of the axial directions.

16. A method for use of a robot, the robot operating in a support mode including a first mode in which the robot autonomously moves to guide a user who is walking and a second mode in which the robot moves in accordance with a first load applied to a handlebar of the robot, the method comprising:

detecting a second load applied to the handlebar when the robot moves in the first mode; and switching the support mode of the robot from the first mode to the second mode on the basis of the detected second load.

* * * * *